US012460114B2

(12) United States Patent
Cao et al.

(10) Patent No.: US 12,460,114 B2
(45) Date of Patent: Nov. 4, 2025

(54) HYDROSILYLATION REACTION CURED SILICONE PRESSURE SENSITIVE ADHESIVE, COMPOSITION AND METHOD FOR ITS PREPARATION, AND USE IN A FLEXIBLE DISPLAY DEVICE

(71) Applicant: Dow Silicones Corporation, Midland, MI (US)

(72) Inventors: Qing Cao, Shanghai (CN); Yan Zhou, Shanghai (CN); Chao Ma, Shanghai (CN)

(73) Assignee: Dow Silicone Corporation, Midland, MI (US)

( * ) Notice: Subject to any disclaimer, the term of this patent is extended or adjusted under 35 U.S.C. 154(b) by 231 days.

(21) Appl. No.: 18/262,024

(22) PCT Filed: Apr. 27, 2021

(86) PCT No.: PCT/CN2021/090314
§ 371 (c)(1),
(2) Date: Jul. 19, 2023

(87) PCT Pub. No.: WO2022/226797
PCT Pub. Date: Nov. 3, 2022

(65) Prior Publication Data
US 2024/0294814 A1    Sep. 5, 2024

(51) Int. Cl.
*C09J 5/00* (2006.01)
*C09J 183/04* (2006.01)

(52) U.S. Cl.
CPC ............. *C09J 183/04* (2013.01); *C09J 5/00* (2013.01); *C09J 2301/302* (2020.08); *C09J 2483/00* (2013.01); *Y10T 428/28* (2015.01); *Y10T 428/2852* (2015.01)

(58) Field of Classification Search
None
See application file for complete search history.

(56) References Cited

U.S. PATENT DOCUMENTS

| | | | |
|---|---|---|---|
| 2,431,878 A | 12/1947 | McGregor et al. | |
| 2,644,805 A | 7/1953 | Martin et al. | |
| 2,676,182 A | 4/1954 | Daudt et al. | |
| 2,823,218 A | 2/1958 | Speir et al. | |
| 2,842,521 A | 7/1958 | Nitzsche et al. | |
| 3,020,308 A | 2/1962 | Stange et al. | |
| 3,050,490 A | 8/1962 | Nitzsche et al. | |
| 3,050,491 A | 8/1962 | Nitzsche et al. | |
| 3,070,559 A | 12/1962 | Nitzsche et al. | |
| 3,070,567 A | 12/1962 | Nitzsche et al. | |
| 3,146,799 A | 9/1964 | Fekete et al. | |
| 3,159,601 A | 12/1964 | Ashby et al. | |
| 3,177,176 A | 4/1965 | Boot et al. | |
| 3,213,048 A | 10/1965 | Boot et al. | |
| 3,220,972 A | 11/1965 | Lamoreaux et al. | |
| 3,230,121 A | 1/1966 | Nitzsche et al. | |
| 3,231,542 A | 1/1966 | Eisinger et al. | |
| 3,296,182 A | 1/1967 | Fekete et al. | |
| 3,296,291 A | 1/1967 | Scotia et al. | |
| 3,330,797 A | 7/1967 | Kelly et al. | |
| 3,379,607 A | 4/1968 | Foster et al. | |
| 3,419,593 A | 12/1968 | Willing et al. | |
| 3,445,420 A | 5/1969 | Kookootsedes et al. | |
| 3,516,946 A | 6/1970 | Scotia et al. | |
| 3,715,334 A | 2/1973 | Karstedt | |
| 3,814,730 A | 6/1974 | Karstedt et al. | |
| 3,928,629 A | 12/1975 | Chandra et al. | |
| 3,957,713 A | 5/1976 | Jeram et al. | |
| 3,989,667 A | 11/1976 | Lee et al. | |
| 3,989,668 A | 11/1976 | Lee et al. | |
| 4,329,273 A | 5/1982 | Hardman et al. | |
| 4,371,493 A | 2/1983 | Minuto | |
| 4,487,810 A | 12/1984 | Ascarelli et al. | |
| 4,611,042 A | 9/1986 | Rivers-Farrell et al. | |
| 4,713,405 A | 12/1987 | Koga et al. | |
| 4,766,176 A | 8/1988 | Lee et al. | |
| 4,774,310 A | 9/1988 | Butler | |
| 4,784,879 A | 11/1988 | Lee et al. | |
| 5,017,654 A | 5/1991 | Togashi et al. | |
| 5,036,117 A | 7/1991 | Chung et al. | |
| 5,082,706 A | 1/1992 | Tangney | |
| 5,175,325 A | 12/1992 | Brown et al. | |
| 5,961,770 A * | 10/1999 | Cifuentes | C08L 83/00 156/60 |
| 6,451,382 B2 | 9/2002 | Schutt et al. | |
| 6,576,051 B2 | 6/2003 | Bardman et al. | |
| 6,677,407 B1 | 1/2004 | Bilgrien et al. | |
| 6,703,120 B1 | 3/2004 | Ko et al. | |
| 6,730,397 B2 | 5/2004 | Melancon et al. | |

(Continued)

FOREIGN PATENT DOCUMENTS

| CN | 105733497 | 7/2016 |
|---|---|---|
| CN | 108047449 | 5/2018 |

(Continued)

OTHER PUBLICATIONS

"DOWSIL™ 7429 PSA Additive Technical Data Sheet", The Dow Chemical Company, Date 2021.

*Primary Examiner* — Anish P Desai
(74) *Attorney, Agent, or Firm* — Catherine U. Brown

(57) ABSTRACT

Disclosed is a silicone pressure sensitive adhesive which is prepared by curing a hydrosilylation reaction curable composition. The silicone pressure sensitive adhesive is useful in preparation of components of flexible display devices.

16 Claims, 1 Drawing Sheet

(56) References Cited

U.S. PATENT DOCUMENTS

| | | |
|---|---|---|
| 8,580,073 B2 | 11/2013 | Behl et al. |
| 8,785,507 B2 | 7/2014 | Bloomfield |
| 9,006,357 B2 | 4/2015 | Yang et al. |
| 9,550,864 B2 | 1/2017 | Bloomfield |
| 9,562,149 B2 | 2/2017 | Cray et al. |
| 9,593,209 B2 | 3/2017 | Dent et al. |
| 10,370,499 B2 | 8/2019 | Kumar et al. |
| 10,444,798 B2 | 10/2019 | Choi et al. |
| 10,920,113 B2 | 2/2021 | Park et al. |
| 10,935,700 B2 | 3/2021 | Hashimoto et al. |
| 11,104,828 B1 * | 8/2021 | Cao ..................... C09J 183/04 |
| 11,773,305 B2 * | 10/2023 | Cao ..................... C09J 183/04 |
| | | 156/329 |
| 12,091,595 B2 * | 9/2024 | Endo ..................... C09D 183/04 |
| 12,384,948 B2 * | 8/2025 | Jiang ..................... C08G 77/08 |
| 2003/0088042 A1 | 5/2003 | Griswold et al. |
| 2003/0091837 A1 * | 5/2003 | Aoki ..................... C08K 5/134 |
| | | 428/447 |
| 2004/0254274 A1 | 12/2004 | Griswold |
| 2005/0038188 A1 | 2/2005 | Ahn et al. |
| 2007/0099007 A1 | 5/2007 | Benayoun et al. |
| 2007/0148475 A1 | 6/2007 | Sherman et al. |
| 2009/0061338 A1 | 3/2009 | Wu |
| 2012/0328863 A1 | 12/2012 | Kuo |
| 2016/0376482 A1 | 12/2016 | Morgeneyer et al. |
| 2017/0200915 A1 | 7/2017 | Lee et al. |
| 2017/0233612 A1 | 8/2017 | Han et al. |
| 2018/0126706 A1 | 5/2018 | Erdogan-Haug et al. |
| 2018/0208799 A1 | 7/2018 | Liu et al. |
| 2019/0309421 A1 | 10/2019 | Harvey et al. |
| 2020/0071578 A1 | 3/2020 | Huo et al. |
| 2022/0380550 A1 | 12/2022 | Fukui et al. |

FOREIGN PATENT DOCUMENTS

| | | |
|---|---|---|
| EP | 0556023 | 8/1993 |
| EP | 0347895 | 11/1993 |
| JP | 1984155483 | 10/1984 |
| JP | 1986089281 | 6/1986 |
| JP | 2003327833 | 11/2003 |
| JP | 2009203470 | 9/2009 |
| WO | 2009131838 | 10/2009 |
| WO | 2011039318 | 4/2011 |
| WO | 2020032285 | 2/2020 |
| WO | 2021000279 | 1/2021 |
| WO | 2021000280 | 1/2021 |
| WO | 2021081863 | 5/2021 |
| WO | 2021142653 | 7/2021 |

* cited by examiner

HYDROSILYLATION REACTION CURED SILICONE PRESSURE SENSITIVE ADHESIVE, COMPOSITION AND METHOD FOR ITS PREPARATION, AND USE IN A FLEXIBLE DISPLAY DEVICE

CROSS REFERENCE TO RELATED APPLICATIONS

This application is a U.S. national stage filing under 35 U.S.C. § 371 of PCT Application No. PCT/CN2021/090314 filed on 27 Apr. 2021. PCT Application No. PCT/CN2021/090314 is hereby incorporated by reference.

FIELD

This invention relates to a silicone pressure sensitive adhesive and methods for its preparation and use. More particularly, this invention relates to a hydrosilylation curable composition that cures to from the silicone pressure sensitive adhesive, which is suitable for use in a flexible display device.

INTRODUCTION

Flexible display devices that can be deformed, e.g., by bending, folding, winding, rolling up, or stretching are being developed. Flexible display devices can be deformed depending on the needs of the consumer or the situations where the flexible display device is used. Typically, various components of display devices are made with multiple layers, and it is important for the layers to adhere to one another and not suffer damage causing failure of the component when the flexible display device is deformed. A silicone pressure sensitive adhesive plays a critical role to couple different layers together and release the stress imposed on various layers of display devices during repeated deformations, e.g., by bending, folding, winding, rolling up, or stretching. To have a good durability performance in flexible display device, the silicone pressure sensitive adhesive should have low storage modulus (G') and low glass transition temperature (Tg). However, the release force of the cured silicone pressure sensitive adhesive with low Tg and low G', especially the release force of cured silicone pressure sensitive adhesive with low Tg and low G' on the wet casting side, is very high, which may bring troubles to the process to make flexible display devices.

There is an industry need for a silicone pressure sensitive adhesive that has one or more of the following properties: high temperature resistance, good durability, low release force especially on wet casting side, and good optical performance that also does not cause failure in a flexible display device SUMMARY A hydrosilylation reaction curable composition is curable to form a silicone pressure sensitive adhesive. A method for making the composition, and a method for fabricating an article using the composition, are provided.

The article may comprise a component of a flexible display device.

REFERENCE NUMERALS

Figure 1:
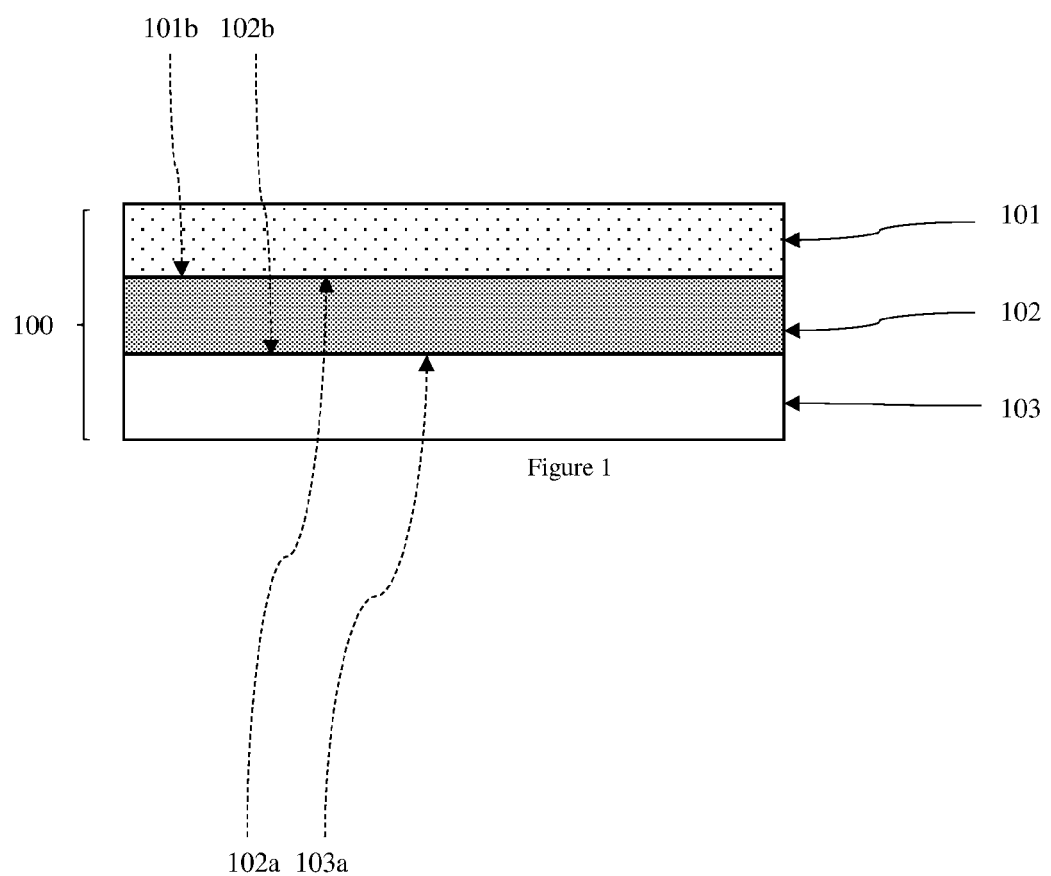
FIG. 1 shows a partial cross section of a laminate article 100.

100 portion of a laminate article
101 second release liner
101*b* surface of second release liner 101
102 silicone pressure sensitive adhesive
102*a* surface of silicone pressure sensitive adhesive 102
102*b* opposing surface of silicone pressure sensitive adhesive 102
103 first release liner
103*a* surface of first release liner 103

DETAILED DESCRIPTION

The hydrosilylation reaction curable composition for forming the silicone pressure sensitive adhesive comprises:
35.15 weight % to 43.63 weight % based on combined weights of starting materials (A) to (F) in the composition of (A) a polydiorganosiloxane gum component, where (A) the polydiorganosiloxane gum component comprises
28.03 weight % to 43.5 weight %, based on combined weights of starting materials (A) to (F), of (A-1) an aliphatically unsaturated polydiorganosiloxane gum of unit formula $(R^M_2R^U SiO_{1/2})_2(R^M_2 SiO_{2/2})_a$, where each $R^M$ is an independently selected monovalent hydrocarbon group of 1 to 30 carbon atoms that is free of aliphatic unsaturation; each $R^U$ is an independently selected monovalent aliphatically unsaturated hydrocarbon group of 2 to 30 carbon atoms; and subscript a has a value sufficient to give the aliphatically unsaturated polydiorganosiloxane gum a plasticity of 20 mil (0.51 mm) to 80 mil (2.03 mm); and
0 to <0.3 weight % of (A-2) a hydroxyl-terminated polydiorganosiloxane gum of unit formula $((HO)R^M_2SiO_{1/2})_2(R^M_2SiO_{2/2})_{a'}$, where each $R^M$ is an independently selected monovalent hydrocarbon group of 1 to 30 carbon atoms that is free of aliphatic unsaturation; each subscript a' has a value sufficient to give the polydiorganosiloxane gum a plasticity of 20 mil (0.51 mm) to 80 mil (2.03 mm); and 0 to 7 weight % of (A-3) a non-functional polydiorganosiloxane gum of unit formula $(R^M_3SiO_{1/2})_2(R^M_2SiO_{2/2})_{a''}$, where each $R^M$ is an independently selected monovalent hydrocarbon group of 1 to 30 carbon atoms that is free of aliphatic unsaturation, and subscript a" has a value sufficient to give the non-functional polydiorganosiloxane gum a plasticity of 20 mil (0.51 mm) to 80 mil (2.03 mm);
52.69 weight % to 63.26 weight % based on combined weights of starting materials (A) to (F) in the composition of (B) a polyorganosilicate resin component, where (B) the polyorganosilicate resin component comprises
52.39 weight % to 63.11 weight %, based on combined weights of starting materials (A) to (F), of (B-1) a capped resin of unit formula: $(R^M_3SiO_{1/2})_z(SiO_{4/2})_o Z_p$, where Z is a hydrolyzable group, subscript p is 0 to a value sufficient to give the capped resin a hydrolyzable group content up to 2%, subscripts z and o have values such that z>4, o>1, and a quantity (z+o) has a value sufficient to provide the capped resin with a number average molecular weight of 500 g/mol to 5,000 g/mol; and
0 to 0.37 weight %, based on combined weights of starting materials (A) to (F), of (B-2) an uncapped resin of unit formula $(R^M_3SiO_{1/2})_{z'}(SiO_{4/2})_{o'}Z_{p'}$, where subscript p' has a value sufficient to give the uncapped resin a hydrolyzable group content of >3% to 10%, subscripts z' and o' have values such that z'>4, o'>1, and a quantity (z'+o') has a value sufficient to provide the uncapped resin with a number average molecular weight of 500 g/mol to 5,000 g/mol, where (B-1) the capped resin and (B-2) the uncapped resin are present in a combined amount of 52.6 weight % to 64.0 weight %, based on combined weights of starting materials (A) to (F);

where (A) the polydiorganosiloxane gum component and (B) the polyorganosilicate resin component are present in a weight ratio of (B):(A) (Resin:Gum Ratio)≤1.8;

0.01 weight % to 5 weight %, based on combined weights of starting materials (A) to (F), of (C) a hydrosilylation reaction catalyst;

(D) a polyorganohydrogensiloxane of unit formula: $(R^M_2SiO_{2/2})_e(HR^MSiO_{2/2})_f(R^M_2HSiO_{1/2})_g(R^M_3SiO_{1/2})_h$; where subscript e≥0, subscript f≥0, a quantity (e+f) is 4 to 500, subscript g is 0, 1, or 2, subscript h is 0, 1, or 2, a quantity (g+h)=2, and a quantity (f+g)≥3; where (D) the polyorganohydrogensiloxane is present in an amount sufficient to provide a mole ratio of silicon bonded hydrogen atoms to aliphatically unsaturated hydrocarbon groups of (A) the polydiorganosiloxane gum, {(D):(A) ratio}, of 30:1 to 66:1;

>0 weight % to <2.43 weight %, based on combined weights of starting materials (A) to (F), of (E) a trialkyl borate;

0 weight % to 5 weight %, based on combined weights of starting materials (A) to (F), of (F) a hydrosilylation reaction inhibitor;

>0 weight % to 90 weight %, based on combined weights of all starting materials in the composition, of (G) a solvent; and 0 to 5 weight %, based on combined weights of starting materials (A) to (F), of (H) an anchorage additive.

(A) Polydiorganosiloxane Gum Component

The hydrosilylation reaction curable composition comprises (A) the polydiorganosiloxane gum component. The polydiorganosiloxane gum component comprises: (A-1) the aliphatically unsaturated polydiorganosiloxane gum. The polydiorganosiloxane gum component may optionally further comprise one or both of (A-2) the hydroxyl-terminated polydiorganosiloxane gum, and (A-3) the non-functional polydiorganosiloxane gum.

Starting material (A-1), the aliphatically unsaturated polydiorganosiloxane gum, has unit formula: $(R^M_2R^U SiO_{1/2})_2(R^M_2SiO_{2/2})_a$, where each $R^M$ is an independently selected monovalent hydrocarbon group of 1 to 30 carbon atoms that is free of aliphatic unsaturation; each $R^U$ is an independently selected monovalent aliphatically unsaturated hydrocarbon group of 2 to 30 carbon atoms; and subscript a has a value sufficient to give (A-1) the aliphatically unsaturated polydiorganosiloxane gum the plasticity of 20 mil (0.51 mm) to 80 mil (0.203 mm), alternatively 30 mil (0.76 mm) to 70 mil (1.78 mm), and alternatively 55 mil (1.40 mm) to 65 mil (1.65 mm), where plasticity is measured based on ASTM D926 by applying 1 kg load to a spherical sample of 4.2 g in weight for 3 minutes at 25° C. and the results are measured in thousandths of an inch (mil) and the procedure is based on ASTM D926.

In unit formula (A-1), each $R^M$ is an independently selected monovalent hydrocarbon group of 1 to 30 carbon atoms that is free of aliphatic unsaturation. Alternatively, each $R^M$ may have 1 to 12 carbon atoms, and alternatively 1 to 6 carbon atoms. Suitable monovalent hydrocarbon groups for $R^M$ are exemplified by alkyl groups and aromatic groups such as aryl groups and aralkyl groups. "Alkyl" means a cyclic, branched, or unbranched, saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 or more carbon atoms; and cyclic alkyl groups such as cyclopentyl and cyclohexyl. "Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. "Aralkyl" means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl. Alternatively, each $R^M$ may be independently selected from the group consisting of alkyl and aryl. Alternatively, each $R^M$ may be independently selected from methyl and phenyl. Alternatively, each $R^M$ may be alkyl. Alternatively, each $R^M$ may be methyl.

In unit formula (A-1), each $R^U$ is an independently selected monovalent aliphatically unsaturated hydrocarbon group of 2 to 30 carbon atoms. Alternatively, each $R^U$ may have 2 to 12 carbon atoms, and alternatively 2 to 6 carbon atoms. Suitable monovalent aliphatically unsaturated hydrocarbon groups include alkenyl groups and alkynyl groups. "Alkenyl" means a branched or unbranched, monovalent hydrocarbon group having one or more carbon-carbon double bonds. Suitable alkenyl groups are exemplified by vinyl, allyl, butenyl, pentenyl, hexenyl, and heptenyl, (including branched and linear isomers of 3 to 7 carbon atoms); and cyclohexenyl. "Alkynyl" means a branched or unbranched, monovalent hydrocarbon group having one or more carbon-carbon triple bonds. Suitable alkynyl groups are exemplified by ethynyl, propynyl, and butynyl (including branched and linear isomers of 2 to 4 carbon atoms). Alternatively, each $R^U$ may be alkenyl, such as vinyl, allyl, or hexenyl.

Polydiorganosiloxane gums are known in the art and may be prepared by methods such as hydrolysis and condensation of the corresponding organohalosilanes or equilibration of cyclic polydiorganosiloxanes. Examples of suitable polydiorganosiloxane gums for use in the hydrosilylation reaction curable composition are exemplified by:

i) dimethylvinylsiloxy-terminated polydimethylsiloxane,
ii) dimethylvinylsiloxy-terminated poly(dimethylsiloxane/methylphenyl)siloxane,
iii) dimethylvinylsiloxy-terminated poly(dimethylsiloxane/diphenyl)siloxane,
iv) phenyl,methyl,vinyl-siloxy-terminated polydimethylsiloxane,
v) dimethylhexenylsiloxy-terminated polydimethylsiloxane,
vi) dimethylhexenyl-siloxy terminated poly(dimethylsiloxane/methylphenyl)siloxane,
vii) dimethylvinylsiloxy-terminated poly(dimethylsiloxane/diphenyl)siloxane,
viii) a combination of two or more of i) to vii). Alternatively, the polydiorganosiloxane gum may be selected from the group consisting of i) dimethylvinylsiloxy-terminated polydimethylsiloxane, v) dimethylhexenylsiloxy-terminated polydimethylsiloxane, and a combination i) and v)).

Starting material (A-1), the aliphatically unsaturated polydiorganosiloxane gum, is present in the hydrosilylation reaction curable composition in an amount of at least 28.0 weight %, alternatively at least 30 weight %, alternatively at least 35 weight %, and alternatively at least 35.5 weight %, while at the same time the amount may be up to 43.5 weight %, alternatively up to 43.1%, alternatively up to 40%, and alternatively up to 35.9 weight %, based on combined weights of starting materials (A) to (F). Alternatively, the amount of (A-1) the aliphatically unsaturated polydiorganosiloxane gum may be 28 weight % to 43.5 weight %, alternatively 35.8 weight % to 43.5 weight %, and alternatively 43.0 weight % to 43.5 weight %, based on combined weights of starting materials (A) to (F).

Starting material (A) the polydiorganosiloxane component may optionally further comprise (A-2) a hydroxyl-terminated polydiorganosiloxane gum of unit formula: $\{(HO)R^M_2SiO_{1/2}\}_2(R^M_2SiO_{2/2})_{a'}$, where $R^M$ is as described above; and subscript a' has a value sufficient to give (A-2) the hydroxyl-terminated polydiorganosiloxane gum a plasticity of 20 mil (0.51 mm) to 80 mil (2.03 mm), alternatively 30 mil (0.76 mm) to 70 mil (1.78 mm), and alternatively 45 mil (1.14 mm) to 65 mil (1.65 mm), where plasticity is measured based on ASTM D926 by applying 1 kg load to a spherical sample of 4.2 g in weight for 3 minutes at 25° C. and the results are measured in thousandths of an inch (mil) and the procedure is based on ASTM D926.

Hydroxyl-terminated polydiorganosiloxane gums suitable for use as starting material (A-2) are known in the art and may be prepared by methods such as hydrolysis and condensation of the corresponding organohalosilanes or equilibration of cyclic polydiorganosiloxanes. Examples of suitable hydroxyl-terminated polydiorganosiloxane gum for use as starting material (A-2) in the hydrosilylation reaction curable composition are exemplified by:
i) bis-hydroxyl-terminated polydimethylsiloxane,
ii) bis-hydroxyl-terminated poly(dimethylsiloxane/methylphenylsiloxane),
iii) bis-hydroxyl-terminated poly(dimethylsiloxane/diphenylsiloxane),
iv) phenyl,methyl,hydroxyl-siloxy-terminated polydimethylsiloxane,
v) a combination of two or more of i) to iv). Alternatively, starting material (A-2) comprise bis-hydroxyl-terminated polydimethylsiloxane.

Starting material (A-2) the hydroxyl-terminated polydiorganosiloxane gum is optionally present in the hydrosilylation reaction curable composition, and may be present in an amount of 0 weight % to 0.3 weight %, based on combined weights of starting materials (A) to (F). Alternatively, when present (A-2) the hydroxyl-terminated polydiorganosiloxane gum may be present in an amount of at least 0.1 weight %, alternatively at least 0.13 weight %, while at the same time the amount may be up to 0.26 weight %, alternatively up to 0.13 weight %, on the same basis.

Starting material (A) the polydiorganosiloxane component may optionally further comprise (A-3) a non-functional polydiorganosiloxane gum of unit formula: $(R^M_3SiO_{1/2})_2(R^M_2SiO_{2/2})_{a''}$, where $R^M$ is as described above; and subscript a'' has a value sufficient to give (A-3) the non-functional polydiorganosiloxane gum a plasticity of 20 mil (0.51 mm) to 80 mil (2.03 mm), alternatively 30 mil (0.76 mm) to 80 mil (2.03 mm), alternatively 45 mil (1.14 mm) to 75 mil (1.91 mm), and alternatively 60 mil (1.52 mm) to 70 mil (1.78 mm) where plasticity is measured based on ASTM D926 by applying 1 kg load to a spherical sample of 4.2 g in weight for 3 minutes at 25° C. and the results are measured in thousandths of an inch (mil) and the procedure is based on ASTM D926.

Non-functional polydiorganosiloxane gums suitable for use as starting material (A-3) are known in the art and may be prepared by methods such as hydrolysis and condensation of the corresponding organohalosilanes or equilibration of cyclic polydiorganosiloxanes. Examples of suitable non-functional polydiorganosiloxane gum for use as starting material (A-3) in the hydrosilylation reaction curable composition are exemplified by:
i) bis-trimethylsiloxy-terminated polydimethylsiloxane,
ii) bis-trimethylsiloxy-terminated poly(dimethylsiloxane/methylphenylsiloxane),
iii) bis-trimethylsiloxy-terminated poly(dimethylsiloxane/diphenylsiloxane),
iv) phenyl,dimethyl-siloxy-terminated polydimethylsiloxane,
v) a combination of two or more of i) to iv). Alternatively, starting material (A-3) comprise bis-trimethylsiloxy-terminated polydimethylsiloxane.

Starting material (A-3) the non-functional polydiorganosiloxane gum is optionally present in the hydrosilylation reaction curable composition, and may be present in an amount of 0 weight % to 7 weight %, based on combined weights of starting materials (A) to (F). Alternatively, when present (A-3) the non-functional polydiorganosiloxane gum may be present in an amount of at least 1 weight %, alternatively at least 2 weight %, while at the same time the amount may be up to 7 weight %, alternatively up to 5 weight %, on the same basis. Alternatively, (A-3) the functional polydiorganosiloxane gum may be omitted.

(B) Polyorganosilicate Resin Component

The hydrosilylation reaction curable composition further comprises starting material (B), a polyorganosilicate resin component, which comprises (B-1) a capped resin and (B-2) an uncapped resin. Polyorganosilicate resins, which comprises monofunctional units ("M" units) of formula $R^M_3SiO_{1/2}$ and tetrafunctional silicate units ("Q" units) of formula $SiO_{4/2}$, where $R^M$ is as described above. Alternatively, at least one-third, alternatively at least two thirds of the $R^M$ groups are alkyl groups (e.g., methyl groups). Alternatively, the M units may be exemplified by $(Me_3SiO_{1/2})$ and $(Me_2PhSiO_{1/2})$. The polyorganosilicate resin is soluble in solvents such as those described below, exemplified by liquid hydrocarbons, such as benzene, toluene, xylene, and heptane, or in liquid organosilicon compounds such as low viscosity linear and cyclic polydiorganosiloxanes.

When prepared, the polyorganosilicate resin comprises the M and Q units described above, and the polyorganosiloxane further comprises units with silicon bonded hydroxyl groups and may comprise neopentamer of formula $Si(O-siR^M_3)_4$, where $R^M$ is as described above, e.g., the neopentamer may be tetrakis(trimethylsiloxy)silane. $^{29}Si$ NMR spectroscopy may be used to measure hydroxyl content and molar ratio of M and Q units, where said ratio is expressed as $\{M(resin)\}/\{Q(resin)\}$, excluding M and Q units from the neopentamer. M:Q ratio represents the molar ratio of the total number of triorganosiloxy groups (M units) of the resinous portion of the polyorganosilicate resin to the total number of silicate groups (Q units) in the resinous portion. M:Q ratio may be 0.5:1 to 1.5:1.

The Mn of the polyorganosilicate resin depends on various factors including the types of hydrocarbon groups represented by $R^M$ that are present. The Mn of the polyorganosilicate resin refers to the number average molecular weight measured using GPC, when the peak representing the neopentamer is excluded from the measurement. The Mn of the polyorganosilicate resin is 500 g/mol to 5,000 g/mol, alternatively 2,500 g/mol to 5,000 g/mol, alternatively 2,700 g/mol to 4,900 g/mol, and alternatively 2,700 g/mol to 4,700 g/mol. A suitable GPC test method for measuring Mn is disclosed in U.S. Pat. No. 9,593,209, Reference Example 1 at col. 31.

U.S. Pat. No. 8,580,073 at col. 3, line 5 to col. 4, line 31, and U.S. Patent Publication 2016/0376482 at paragraphs [0023] to [0026] are hereby incorporated by reference for disclosing MQ resins, which are suitable polyorganosilicate resins for use in the hydrosilylation reaction curable composition described herein. The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^M_3SiX^1$, where $R^M$ is as described above and $X^1$ represents a hydrolyzable substituent such as halogen, alkoxy, acyloxy, hydroxyl, oximo, or ketoximo; alternatively, halogen, alkoxy or hydroxyl. Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above is an uncapped resin, which typically contains silicon bonded hydroxyl groups, e.g., of formulae, $HOSi_{3/2}$ and/or $HOR^M_2SiO_{1/2}$. The polyorganosilicate resin may comprise >3% to 10% of silicon bonded hydroxyl groups, as measured by NMR spectroscopy. For certain applications, it may be desirable for the amount of silicon bonded hydroxyl groups to be ≤2%, alternatively <0.7%, alternatively below 0.3%, alternatively less than 1%, and alternatively 0.3% to 2%. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group in a process referred to a capping. Silanes containing hydrolyzable groups may be added in molar excess of the quantity required to react with the silicon bonded hydroxyl groups on the polyorganosilicate resin.

When the polyorganosilicate resin is a capped resin, the capped may comprise 2% or less, alternatively 0.7% or less, and alternatively 0.3% or less, and alternatively 0.3% to 0.8% of units represented by formula $HOSiO_{3/2}$ and/or $HOR^M_2SiO_{1/2}$ where $R^M$ is as described above. The concentration of silanol groups present in the polyorganosiloxane may be determined using NMR spectroscopy as described above.

Therefore, the polyorganosilicate resin component comprises (B-1) a capped resin as described above and (B-2) an uncapped resin as described above. The capped resin may have unit formula: $(R^M_3SiO_{1/2})_z(SiO_{4/2})_oZ_p$, where $R^M$ is as described above and subscripts z and o have values such that o>1, and subscript z>4, a quantity (o+z) has a value sufficient to give the capped resin the Mn described above (e.g., 500 g/mol to 5,000 g/mol, alternatively 1,000 g/mol to 4,700 g/mol, alternatively 2,900 g/mol to 4,700 g/mol, and alternatively 2,900 g/mol to 4,100 g/mol)), and subscript p has a value sufficient to give the capped resin a hydrolyzable group content as described above (e.g., 0 to 2%, alternatively 0 to 0.7%, and alternatively 0 to 0.3%). Starting material (B-1) the capped resin, may be present in an amount of 52.3 weight % to 63.11 weight %, based on combined weights of starting materials (A) to (F). Alternatively, (B-1) the capped resin, may be present in an amount of 52.3 weight % to 62.7 weight %, alternatively 52.3 weight % to 52.9 weight %, and alternatively 62.2 weight % to 63.2 weight %, on the same basis. Alternatively, the amount of (B-1) the capped resin may be at least 52.3%, alternatively at least 53%, and alternatively at least 54%; while at the same time the amount may be up to 62.7%, alternatively up to 62%, alternatively up to 60%, alternatively up to 55%, alternatively up to 54%, on the same basis.

Starting material (B-2), the uncapped resin, may have unit formula $(R^M_3SiO_{1/2})_{z'}(SiO_{4/2})_{o'}Z_{p'}$, where $R^M$ is as described above and subscripts z' and o' have values such that o'>1, and subscript z'>4, a quantity (o'+z') has a value sufficient to give the uncapped resin the Mn described above (e.g., 500 g/mol to 5,000 g/mol, alternatively 1,000 g/mol to 4,700 g/mol, alternatively 2,700 g/mol to 4,700 g/mol, and alternatively 2,900 g/mol to 3,800 g/mol)), and subscript p' has a value sufficient to give the uncapped resin a hydrolyzable group content as described above (e.g., >3% to 10%). Starting material (B-2) the uncapped resin, is optional, and its amount may be 0. Alternatively, when used, (B-2) the uncapped resin may be present in an amount of >0 weight % to 0.3 weight %, alternatively 0.1 weight % to 0.3 weight %, and alternatively 0.1 weight % to 0.2 weight %, based on combined weights of starting materials (A) to (F).

The hydrosilylation reaction curable composition comprises (B) the polyorganosilicate resin component in an amount of 52.6 weight % to 63.3 weight %, alternatively 52.6 weight % to 62.7 weight %, alternatively 53.0 weight % to 62.4 weight %, and alternatively 52.6 weight % to 53.1 weight %; based on combined weights of starting materials (A) to (F) (e.g., combined amounts of (B-1) the capped resin and (B-2) the uncapped resin, based on combined weights of all starting materials in the hydrosilylation reaction curable composition, excluding solvent). When (B-2) the uncapped resin is present, the amounts of capped resin and uncapped resin in starting material (B) may be sufficient to provide a weight ratio of uncapped resin:capped resin {i.e., (B-2):(B-1) ratio} of <0.12:1; alternatively ≤0.006:1, alternatively 0.001:1 to 0.12:1.

Starting material (A) the polydiorganosiloxane gum component, and starting material (B), the polyorganosilicate resin component may be present in the hydrosilylation reaction curable composition in amounts sufficient to provide a weight ratio of (B) polyorganosilicate resin component: (A) polydiorganosiloxane gum component {i.e., (B):(A) ratio}≤1.8:1. Alternatively, the (B):(A) ratio may be at least 1.2:1, alternatively at least 0.1.5:1; while at the same time the (B):(A) ratio may be up to 1.8:1, alternatively up to 1.75:1. Alternatively, the (B):(A) ratio may be 1.2:1 to 1.8:1; alternatively 1.2:1 to 1.25:1.

(C) Hydrosilylation Reaction Catalyst

Starting material (C) in the hydrosilylation reaction curable composition is a hydrosilylation reaction catalyst.

Hydrosilylation reaction catalysts are known in the art and are commercially available. Hydrosilylation reaction catalysts include platinum group metal catalysts. Such hydrosilylation reaction catalysts can be (C-1) a metal selected from platinum, rhodium, ruthenium, palladium, osmium, and iridium; alternatively platinum, ruthenium and iridium; and alternatively the metal may be platinum. Alternatively, the hydrosilylation reaction catalyst may be (C-2) a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, or platinum dichloride. Alternatively, the hydrosilylation reaction catalyst may be (C-3) a complex of the platinum group metal compound with an alkenyl functional organopolysiloxane oligomer, or (C-4) the platinum group metal compound microencapsulated in a matrix or coreshell type structure. Complexes of platinum alkenyl functional organopolysiloxane oligomers include 1,3-diethenyl-1,1,3,3-tetramethyldisiloxane complexes with platinum (Karstedt's Catalyst). Alternatively, the hydrosilylation catalyst may comprise (C-5) the complex microencapsulated in a resin matrix. Exemplary hydrosilylation reaction catalysts are described in U.S. Pat. No. 2,823,218 to Speier; U.S. Pat. No. 3,159,601 to Ashby; U.S. Pat. No. 3,220,972 to Lamoreaux; U.S. Pat. No. 3,296,291 to Chalk, et al.; U.S. Pat. No. 3,419,593 to Willing; U.S. Pat. No. 3,516,946 to Modic; U.S. Pat. No. 3,715,334 to Karstedt; U.S. Pat. No. 3,814,730 to Karstedt; U.S. Pat. No. 3,928,629 to Chandra; U.S. Pat. No. 3,989,668 to Lee, et al.; U.S. Pat. No. 4,766,176 to Lee, et al.; U.S. Pat. No. 4,784,879 to Lee, et al.; U.S. Pat. No. 5,017,654 to Togashi; U.S. U.S. Pat. No. 5,036,117 to Chung, et al.; and U.S. Pat. No. 5,175,325 to Brown; and EP 0 347 895 A to Togashi, et al. Hydrosilylation reaction catalysts are commercially available, for example, SYL-OFF™ 4000 Catalyst and SYL-OFF™ 2700 are available from Dow Silicones Corporation.

The amount of hydrosilylation reaction catalyst used herein will depend on various factors including the selection of starting material (D) the polyorganohydrogensiloxane and (A) the polydiorganosiloxane gum component, and their respective contents of silicon bonded hydrogen atoms (SiH) and aliphatically unsaturated groups, and the content of the platinum group metal in the catalyst selected, however, the amount of hydrosilylation reaction catalyst is sufficient to catalyze hydrosilylation reaction of SiH and aliphatically unsaturated groups, alternatively the amount of catalyst is sufficient to provide 1 ppm to 6,000 ppm of the platinum group metal based on combined weights of starting materials containing silicon bonded hydrogen atoms and aliphatically unsaturated hydrocarbon groups; alternatively 1 ppm to 1,000 ppm, and alternatively 1 ppm to 100 ppm, on the same basis. Alternatively, when the hydrosilylation reaction catalyst comprises a platinum-rganosiloxane complex, the amount of hydrosilylation reaction catalyst may be 0.01% to 5% based on combined weights of starting materials (A) to (F).

(D) Polyorganohydrogensiloxane

Starting material (D) in the hydrosilylation reaction curable composition is a polyorganohydrogensiloxane of unit formula: $(R^M{}_2SiO_{2/2})_e(HR^MSiO_{2/2})_f(R^M{}_2HSiO_{1/2})_g(R^M{}_3SiO_{1/2})_h$; where $R^M$ is as described above, subscript $e \geq 0$, subscript $f \geq 0$, a quantity $(e+f)$ is 4 to 500, subscript $g$ is 0, 1, or 2, subscript $h$ is 0, 1, or 2, a quantity $(g+h)=2$, and a quantity $(f+g) \geq 3$. Alternatively, the quantity $(f+g)$ may be sufficient to provide the polyorganohydrogensiloxane with a silicon bonded hydrogen content of 0.5% to 2%, alternatively 0.6% to 1.5%, where the silicon-bonded hydrogen (Si—H) content of the polyorganohydrogensiloxane can be determined using quantitative infra-red analysis in accordance with ASTM E168.

Suitable polyorganohydrogensiloxanes are exemplified by:

(D-1) bis-dimethylhydrogensiloxy-terminated poly(dimethyl/methylhydrogen)siloxane, (D-2) bis-dimethylhydrogensiloxy-terminated polymethylhydrogensiloxane, (D-3) bis-trimethylsiloxy-terminated poly(dimethyl/methylhydrogen)siloxane, (D-4) bis-trimethylsiloxy-terminated polymethylhydrogensiloxane, and (D-5) a combination of two or more of (D-1), (D-2), (D-3), and (D-4). Methods of preparing polyorganohydrogensiloxanes, such as hydrolysis and condensation of organohydridohalosilanes, are well known in the art, for example, see U.S. Pat. No. 3,957,713 to Jeram et al. and U.S. Pat. No. 4,329,273 to Hardman, et al. Polyorganohydrogensiloxanes can also be prepared as described, for example in U.S. Pat. No. 2,823,218 to Speier, et al., which discloses organohydrogensiloxane oligomers and linear polymers, e.g., 1,1,1,3,3-pentamethyldisiloxane; bis-trimethylsiloxy-terminated polymethylhydrogensiloxane homopolymer; bis-trimethylsiloxy-terminated poly(dimethyl/methylhydrogen)siloxane copolymer; and cyclic polymethylhydrogensiloxanes.

Polyorganohydrogensiloxanes are also commercially available, such as those available from Gelest, Inc. of Morrisville, Pennsylvania, USA, for example, HMS-H271, HMS-071, HMS-993, HMS-301, HMS-301 R, HMS-031, HMS-991, HMS-992, HMS-993, HMS-082, HMS-151, HMS-013, HMS-053, HAM-301, HPM-502, and HMS-HM271.

The amount of polyorganohydrogensiloxane in the hydrosilylation reaction curable composition is 0.1% to 5%, based on combined weights of starting materials (A) to (F). Alternatively, the amount of polyorganohydrogensiloxane in the hydrosilylation reaction curable composition may be at least 0.1%, alternatively at least 0.25%, alternatively at least 0.3%; while at the same time, the amount may be up to 5%, alternatively up to 2.5%, alternatively up to 1.5%, alternatively up to 1%, on the same basis.

The silicon-bonded hydrogen to aliphatically unsaturated group ratio is important when relying on a hydrosilylation cure process. Generally, this is determined by calculating the total weight % of aliphatically unsaturated groups in the composition, e.g. vinyl [V] and the total weight % of silicon bonded hydrogen [H] in the composition and given the molecular weight of hydrogen is 1 and of vinyl is 27 the molar ratio of silicon bonded hydrogen to vinyl is 27[H]/[V]. Starting material (A) the polydiorganosiloxane gum component and (D) the polyorganohydrogensiloxane may be present in the hydrosilylation reaction curable composition in an amount sufficient to provide a mole ratio of silicon bonded hydrogen atoms to aliphatically unsaturated hydrocarbon groups of {(D):(A) ratio} of at least 30:1, alternatively at least 31:1, and alternatively at least 45:1, while at the same time the ratio may be up to 66:1, alternatively up to 60:1, and alternatively up to 59:1. Alternatively, (D):(A)

ratio may be 30:1 to 66:1, alternatively 35:1 to 560:1, alternatively 40:1 to 55:1, and alternatively 45:1 to 60:1.

(E) Trialkyl Borate

Starting material (E) in the hydrosilylation reaction curable composition is a trialkyl borate of formula $B(OR^4)_3$, where each RA is an independently selected alkyl group of 1 to 30 carbon atoms, alternatively 1 to 12 carbon atoms, and alternatively 1 to 6 carbon atoms. The alkyl group may be methyl, ethyl, propyl (e.g., iso-propyl or n-propyl), butyl (e.g., isobutyl, n-butyl, tert-butyl, or sec-butyl), pentyl (e.g., isopentyl, neopentyl, or tert-pentyl), hexyl, a branched alkyl group of 6 carbon atoms, or a cyclic alkyl group such as cyclopentyl or cyclohexyl. Examples of suitable trialkyl borates include trimethyl borate, triethyl borate, tributyl borate, and combinations of two or more thereof. Alternatively, the trialkyl borate may be triethyl borate.

Trialkyl borates are known in the art and may be made by known methods, such as that described in U.S. Pat. No. 3,020,308 to Stange. Trialkyl borates are also commercially available, for example, triethyl borate is available from Meryer (Shanghai) Chemical Technology Co., Ltd., and trialkyl borate additives for silicone compositions are also known in the art, such as DOWSIL™ 7429 PSA Additive, which is available from Dow Silicones Corporation.

The amount of (E) the trialkyl borate added to the hydrosilylation curable composition is >0 weight % to <2.43 weight %, based on combined weights of starting materials (A) to (F). Alternatively, the amount of (E) the trialkyl borate may be at least 0.05 weight %, alternatively at least 0.1 weight %, and alternatively at least 0.2%; while at the same time the amount may be up to 2.42 weight %, alternatively up to 2 weight %, alternatively up to 1 weight %, and alternatively up to 0.5 weight %, on the same basis. Alternatively, the amount of (E) the trialkyl borate may be 0.05 weight % to 1 weight %, and alternatively 0.4 weight % to 1 weight %, on the same basis.

(F) Hydrosilylation Reaction Inhibitor

Starting material (F) is an optional hydrosilylation reaction inhibitor (inhibitor) that may be used for altering the rate of the hydrosilylation reaction, as compared to a composition containing the same starting materials but with the inhibitor omitted. Starting material (F) may be selected from the group consisting of (F-1) an acetylenic alcohol, (F-2) a silylated acetylenic alcohol, (F-3) an ene-yne compound, (F-4) a triazole, (F-5) a phosphine, (F-6) a mercaptan, (F-7) a hydrazine, (F-8) an amine, (F-9) a fumarate, (F-10) a maleate, (F-11) an ether, (F-12) carbon monoxide, (F-13) an alkenyl-functional siloxane oligomer, and (F-14) a combination of two or more thereof. Alternatively, the hydrosilylation reaction inhibitor may be selected from the group consisting of (F-1) an acetylenic alcohol, (F-2) a silylated acetylenic alcohol, (F-9) a fumarate, (F-10) a maleate, (F-13) carbon monoxide, (F-14) a combination of two or more thereof.

Acetylenic alcohols are exemplified by 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof. Acetylenic alcohols are known in the art and are commercially available from various sources, see for example, U.S. Pat. No. 3,445,420 to Kookootsedes, et al. Alternatively, the inhibitor may be a silylated acetylenic compound. Without wishing to be bound by theory, it is thought that adding a silylated acetylenic compound reduces yellowing of the reaction product prepared from hydrosilylation reaction as compared to a reaction product from hydrosilylation of starting materials that do not include a silylated acetylenic compound or that include an organic acetylenic alcohol inhibitor, such as those described above. The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. The silylated acetylenic compound useful as the inhibitor herein may be prepared by methods known in the art, for example, U.S. Pat. No. 6,677,407 to Bilgrien, et al. discloses silylating an acetylenic alcohol described above by reacting it with a chlorosilane in the presence of an acid receptor.

Alternatively, the inhibitor may be an ene-yne compound such as 3-methyl-3-penten-1-yne, 3,5-dimethyl-3-hexen-1-yne; and a combination thereof. Alternatively, the inhibitor may comprise a triazole, exemplified by benzotriazole. Alternatively, the inhibitor may comprise a phosphine. Alternatively, the inhibitor may comprise a mercaptan. Alternatively, the inhibitor may comprise a hydrazine. Alternatively, the inhibitor may comprise an amine. Amines are exemplified by tetramethyl ethylenediamine, 3-dimethylamino-1-propyne, n-methylpropargylamine, propargylamine, 1-ethynylcyclohexylamine, or a combination thereof. Alternatively, the inhibitor may comprise a fumarate. Fumarates include dialkyl fumarates such as diethyl fumarate, dialkenyl fumarates such as diallyl fumarate, dialkoxyalkyl fumarates such as bis-(methoxymethyl)ethyl fumarate. Alternatively, the inhibitor may comprise a maleate. Maleates include dialkyl maleates such as diethyl maleate, dialkenyl maleates such as diallyl maleate, and dialkoxyalkyl maleates such as bis-(methoxymethyl)ethyl maleate. Alternatively, the inhibitor may comprise an ether.

Alternatively, the inhibitor may comprise carbon monoxide. Alternatively, the inhibitor may comprise an alkenyl-functional siloxane oligomer, which may be cyclic or linear such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, 1,3-divinyl-1,3-diphenyl-1,3-dimethyldisiloxane; 1,3-divinyl-1,1,3,3-tetramethyldisiloxane; and a combination of two or more thereof. The compounds useful as inhibitors described above are commercially available, e.g., from Sigma-Aldrich Inc. or Gelest, Inc., and are known in the art, for example, see U.S. Pat. No. 3,989,667 to Lee, et al. Suitable inhibitors for use herein are exemplified by those described as stabilizer E in U.S. Patent Application Publication 20007/0099007 at paragraphs [0148] to [0165].

The amount of inhibitor will depend on various factors including the desired pot life, whether the composition will be a one part composition or a multiple part composition, the particular inhibitor used, and the selection and amount of (C) the hydrosilylation reaction catalyst. However, when present, the amount of (F) the inhibitor may be may range from 0% to 5%, alternatively 0% to 1%, alternatively 0.001% to 1%, alternatively 0.01% to 0.5%, and alternatively 0.01% to 0.4%, based on the combined weights of starting materials (A) to (F) in the hydrosilylation reaction curable composition.

(G) Solvent

The hydrosilylation reaction curable composition further comprises starting material (G), a solvent. The solvent may be an organic solvent such as a hydrocarbon, a ketone, an ester acetate, an ether, and/or a cyclic siloxane having an average degree of polymerization from 3 to 10. Suitable hydrocarbons for the solvent can be (G-1) an aromatic hydrocarbon such as benzene, toluene, or xylene; (G-2) an aliphatic hydrocarbon such as hexane, heptane, octane, or iso-paraffin; or (G-3) a combination thereof. Alternatively, the solvent may be a glycol ether such as propylene glycol methyl ether, dipropylene glycol methyl ether, propylene glycol n-butyl ether. Suitable ketones include acetone, methyl ethyl ketone, or methyl isobutyl ketone. Suitable ester acetates include ethyl acetate or isobutyl acetate. Suitable ethers include diisopropyl ether or 1,4-dioxane. Suitable cyclic siloxanes having a degree of polymerization from 3 to 10, alternatively 3 to 6, include hexamethylcyclotrisiloxane, octamethylcyclotetrasiloxane, and/or decamethylcyclopentasiloxane. Alternatively, the solvent may be selected from the group consisting of benzene, toluene, xylene, heptane, ethyl benzene, ethyl acetate, and a combination of two or more thereof.

The amount of solvent will depend on various factors including the type of solvent selected and the amount and type of other starting materials selected for the hydrosilylation reaction curable composition. However, the amount of solvent may range from >0% to 90%, alternatively 0% to 60%, alternatively 20 to 60%, alternatively 45% to 65%, and alternatively 50% to 60%, based on combined weights of all starting materials in the hydrosilylation reaction curable composition. The solvent can be added during preparation of the hydrosilylation reaction curable composition, for example, to aid mixing and delivery of one or more starting materials, described above. All or a portion of the solvent may be added with one or more of the other starting materials. For example, the polyorganosilicate resin and/or the hydrosilylation reaction catalyst, may be dissolved in a solvent before combination with the other starting materials in the hydrosilylation reaction curable composition. All or a portion of the solvent may optionally be removed after the hydrosilylation reaction curable composition is prepared.

(H) Anchorage Additive

Starting material (H) in the hydrosilylation reaction curable composition is an anchorage additive. Without wishing to be bound by theory, it is thought that the anchorage additive will facilitate bonding to a substrate by a silicone pressure sensitive adhesive prepared by curing the hydrosilylation reaction curable composition described herein.

Suitable anchorage additives for starting material (H) include silane coupling agents such as methyltrimethoxysilane, vinyltrimethoxysilane, allyltrimethoxysilane, 3-methacryloxypropyltrimethoxysilane, 3-aminopropyltrimethoxysilane, N-(2-aminoethyl)-3-aminopropyltrimethoxysilane, bis(trimethoxysilyl)propane, and bis(trimethoxysilylhexane; and mixtures or reaction mixtures of said silane coupling agents. Alternatively, the anchorage additive may be tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltriethoxysilane, allyltriethoxysilane, 3-glycidoxypropyltrimethoxysilane, 3-glycidoxypropyltriethoxysilane, or 3-methacryloxypropyl trimethoxysilane.

Other suitable anchorage additives are exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane).

Exemplary anchorage additives are known in the art, such as in U.S. Pat. No. 9,562,149; U.S. Patent Application Publication Number 2003/0088042, U.S. Patent Application Publication Number 2004/0254274, U.S. Patent Application Publication Number 2005/0038188; U.S. Patent Publication 2012/0328863 at paragraph [0091] and U.S. Patent Publication 2017/0233612 at paragraph [0041]; and European Patent 0 556 023. Anchorage additives are commercially available. For example, SYL-OFF™ 9250, SYL-OFF™ 9176, SYL-OFF™ 297 and SYL-OFF™ 397 are available from Dow Silicones Corporation of Midland, Michigan, USA. Other exemplary anchorage additives include (G-1) vinyltriacetoxysilane, (G-2) glycidoxypropyltrimethoxysilane, and (G-3) a combination of (G-1) and (G-2). This combination (G-3) may be a mixture and/or a reaction product.

The amount of anchorage additive depends on various factors including the type of substrate to which the silicone pressure sensitive adhesive will be adhered. However, when present, the amount of anchorage additive may be 0.5% to 5%, alternatively 0.5% to 3%, and alternatively 0.5% to 2.5%, based on combined weights of all starting materials in the hydrosilylation reaction curable composition, excluding solvent.

Method of Making the Hydrosilylation Reaction Curable Composition

The hydrosilylation reaction curable composition can be prepared by a method comprising combining all starting materials as described above by any convenient means such as mixing at ambient or elevated temperature. The hydrosilylation reaction inhibitor may be added before the hydrosilylation reaction catalyst, for example, when the hydrosilylation reaction curable composition will be prepared at elevated temperature and/or the hydrosilylation reaction curable composition will be prepared as a one part composition.

The method may further comprise delivering one or more starting materials in a solvent (e.g., the hydrosilylation reaction catalyst and/or the polyorganosilicate resin) may be dissolved in a solvent when combined with one or more of the other starting materials in the hydrosilylation reaction curable composition. One skilled in the art would understand that if it is desired that the resulting hydrosilylation reaction curable composition will be solventless (i.e., will contain no solvent or may contain trace amounts of residual solvent from delivery of a starting material), then solvent may be removed after mixing two or more of the starting materials, and in this instance, solvent is not intentionally added to the hydrosilylation reaction curable composition.

Alternatively, the hydrosilylation reaction curable composition may be prepared as a multiple part composition, for example, when the hydrosilylation reaction curable composition will be stored for a long period of time before use, e.g., up to 6 hours before applying the hydrosilylation reaction curable composition on an optical silicone elastomer or other substrate. In the multiple part composition, the hydrosilylation reaction catalyst is stored in a separate part from any starting material having a silicon bonded hydrogen atom, for example the polyorganohydrogensiloxane, and the parts are combined shortly before use of the hydrosilylation reaction curable composition.

For example, a multiple part composition may be prepared by combining starting materials comprising at least some of the polydiorganosiloxane gum component, the polyorganohydrogensiloxane, and optionally one or more other starting materials described above (other than the hydrosilylation reaction catalyst) to form a base part, by any convenient means such as mixing. A curing agent may be prepared by combining starting materials comprising at least some of the polydiorganosiloxane gum, the hydrosilylation reaction catalyst, and optionally one or more other starting materials described above (other than the polyorganohydrogensiloxane) by any convenient means such as mixing. The starting materials may be combined at ambient or elevated temperature. The hydrosilylation reaction inhibitor may be included in one or more of the base part, the curing agent part, or a separate additional part. The polyorganosilicate resin may be added to the base part, the curing agent part, or a separate additional part. Alternatively, the polyorganosilicate resin may be added to the base part. The solvent may be added to the base part. Alternatively, starting materials comprising the polyorganosilicate resin and some or all of the solvent may be added in a separate additional part. Alternatively, the inhibitor may be added to the base part or to a separate additional part. When a two part composition is used, the weight ratio of amounts of base part to curing agent part may range from 1:1 to 10:1. The hydrosilylation reaction curable composition will cure via hydrosilylation reaction to form the silicone pressure sensitive adhesive.

Method of Use

The method described above may further comprise one or more additional steps. The hydrosilylation reaction curable composition prepared as described above may be used to form an adhesive article, e.g., a silicone pressure sensitive adhesive (prepared by curing the hydrosilylation reaction curable composition described above) on a substrate. The method may, therefore, further comprise applying the hydrosilylation reaction curable composition to a substrate.

Applying the hydrosilylation reaction curable composition to the substrate can be performed by any convenient means. For example, the hydrosilylation reaction curable composition may be applied onto a substrate by gravure coater, comma coater, offset coater, offset-gravure coater, roller coater, reverse-roller coater, air-knife coater, slot die or curtain coater.

The substrate can be any material that can withstand the curing conditions (described below) used to cure the hydrosilylation reaction curable composition to form the silicone pressure sensitive adhesive on the substrate. For example, any substrate that can withstand heat treatment at a temperature equal to or greater than 120° C., alternatively 150° C. is suitable. Examples of materials suitable for such substrates may be a release liner on where the silicone pressure sensitive adhesive compositions above will be used for a wet casting method. The release liner will have a fluorosilicone release coating on it. Suitable fluorosilicone release coatings include the commercially available fluorosilicone release coatings, e.g., SYL-OFF™7555 Coating, SYL-OFF™ 7792 Fluorosilicone Release Coating, SYL-OFF™ 7795 Fluorosilicone Release Coating, SYL-OFF™ 7785 Fluorosilicone Release Coating, SYL-OFF™ 7786 Fluorosilicone Release Coating, and mixtures of fluorosilicone release coatings above, all of which are commercially available from Dow Silicones Corporation of Midland, Michigan, USA. The substrates materials may further including polymeric films and/or foams, which may be comprised of polyimide (PI), polyetheretherketone (PEEK), polyethylene naphthalate (PEN), liquid-crystal polyarylate, polyamideimide (PAI), polyether sulfide (PES), polyethylene terephthalate (PET), polycarbonate (PC), polymethylmethacrylate (PMMA), thermoplastic polyurethane (TPU), polyethylene (PE), or polypropylene (PP). Alternatively, the substrate may be glass. The thickness of the substrate is not critical, however, the thickness may be 5 µm to 300 µm, alternatively 10 µm to 200 µm.

To improve bonding of the silicone pressure sensitive adhesive to the substrate, the method for forming the adhesive article may optionally further comprise treating the substrate before applying the hydrosilylation reaction curable composition. Treating the substrate may be performed by any convenient means, such as applying a primer, or subjecting the substrate to corona-discharge treatment, etching, or plasma treatment before applying the hydrosilylation reaction curable composition to the substrate.

The method described herein may optionally further comprise applying a removable release liner to the silicone pressure sensitive adhesive opposite the substrate, e.g., to protect the silicone pressure sensitive adhesive before use of the adhesive article. The release liner may be applied before, during or after curing the hydrosilylation reaction curable composition. Alternatively, the hydrosilylation reaction curable composition described above may be applied on a first release liner and thereafter cured (wet casting) to form a silicone pressure sensitive adhesive layer with a first surface adhering to the first release liner. Optionally, a second release liner may be applied to an opposing surface of the silicone pressure sensitive adhesive (e.g., to the surface of the silicone pressure sensitive adhesive layer opposite the first substrate (dry casting). The adhesive article may be a laminate which is useful for fabricating a component for use in a flexible display device, such as an optical component. For example, the silicone pressure sensitive adhesive may be an optically clear free standing adhesive that can be used when the first release liner (and the second release liner, when present) is removed. Alternatively, one release liner may be removed, and the exposed surface of the silicone pressure sensitive adhesive may be contacted with a substrate, and thereafter the second release liner may be removed, and the second exposed surface of the silicone pressure sensitive adhesive may be contacted with a second substrate. The substrate and/or the second substrate may be layers in a component of a flexible display device, such as a polarization layer or a damping layer.

Use of the Silicone Pressure Sensitive Adhesive in a Component of a Flexible Display Device FIG. 1 shows a partial cross section of a laminate article (100). The laminate article (100) includes a silicone pressure sensitive (102) having a surface (102a) and an opposing surface (102b). The silicone pressure sensitive adhesive (102) is formed by a wet casting process comprising applying the hydrosilylation reaction curable composition prepared as described above to a surface (103a) of a first release liner (103) and curing the composition to form the silicone pressure sensitive adhesive (102). The opposing surface (102b) of the silicone pressure sensitive (102) adheres to the surface (103a) of the first release liner. A second release liner (101) is applied to the silicone pressure sensitive adhesive (102) such that a surface (101b) of the second release liner adheres tot e surface (102) of the silicone pressure sensitive adhesive (102) The silicone pressure sensitive (102) may have a thickness of 10 μm to 200 μm.

The silicone pressure sensitive adhesive described above may be used in fabrication of the flexible display device component (not shown). The first release liner (103) may be removed, leaving the opposing surface (102b) of the silicone pressure sensitive adhesive (102) exposed. The opposing surface (102b) of the silicone pressure sensitive adhesive (102) may then be contacted with another layer in a flexible display device component, such as a damping layer or a polarization layer, (not shown), with pressure to adhere the silicone pressure sensitive adhesive (102) thereto.

Examples

The following examples are provided to illustrate the invention to one skilled in the art and are not to be interpreted as limiting the invention set forth in the claims. Starting materials used herein are described in Table 1.

TABLE 1

Starting Materials

| Starting Material | Source | Chemical Description |
|---|---|---|
| Vi GUM 1 | Dow Silicones Corporation | Bis-dimethylvinylsiloxy-terminated polydimethylsiloxane gum with the average unit formula of $M^{Vi}D_{5836}M^{Vi}$, having the plasticity of 60 mil (1.52 mm), vinyl content is 0.012 wt % |
| Vi GUM 2 | Dow Silicones Corporation | Bis-dimethylvinylsiloxy-terminated polydimethylsiloxane gum with the average unit formula of $M^{Vi}D_xM^{Vi}$, where subscript x is sufficient to give the gum a plasticity of 60 mil (1.52 mm), vinyl content is 0.013 wt %. |
| OH GUM 3 | Dow Silicones Corporation | Bis-hydroxyl-terminated polydimethylsiloxane gum with the average unit formula of $M^{OH}D_xM^{OH}$, where subscript x is sufficient to give the gum a plasticity of 60 mil (1.52 mm) |
| Me GUM 4 | Dow Silicones Corporation | Bis-trimethylsiloxy-terminated polydimethylsiloxane gum with the average unit formula of $MD_xM$, where subscript x is sufficient to give the gum a plasticity of 67 mil (1.70 mm) |
| Uncap MQ Resin 1 | Dow Silicones Corporation | Uncapped polymethylsilicate resin with Mw = 11200 g/mol; Mn = 3800 g/mol, and hydroxyl content of 3.4% |
| Uncap MQ Resin 2 | Dow Silicones Corporation | uncapped polymethylsilicate resin with Mw = 6000 g/mol; Mn = 2700 g/mol and hydroxyl content of 3.4% |
| Me cap MQ Resin 3 | Dow Silicones Corporation | Me-capped polymethylsilicate resin with; Mw = 10500 g/mol; Mn = 4100 g/mol, and hydroxyl content of 1.0% |
| Me cap MQ Resin 4 | Dow Silicones Corporation | Me-Capped polymethylsilicate resin with Mw = 5400 g/mol; Mn = 2900 g/mol, and hydroxyl content of 0.89% |
| Inhibitor 1 | Dow Silicones Corporation | Ethynyl cyclohexanol (ETCH) |
| Inhibitor 2 | Dow Silicones Corporation | Bis maleate intermediate |
| XL 1 | DOWSIL ™ 6-3570 Polymer | Trimethylsiloxy-terminated poly(dimethylsiloxane/ methylhydrogensiloxane) copolymer with SiH % = 0.76%; and viscosity of 5 mPa · s at RT |
| XL 2 | DOWSIL ™ MH 1107 FLUID 30 CST | trimethylsiloxy-terminated polymethylhydrogensiloxane WITH SiH % = 1.6% |
| PSA Additive | Meryer (Shanghai) Chemical Technology Co., Ltd. | 100% triethyl borate |
| Catalyst 1 | SYL-OFF ™ 4000 | a vinyl end-blocked polydimethylsiloxane diluted platinum complex of 1,3-diethenyl-1,1,2,2-tetramethyldisiloxane having a platinum concentration of 5,200 ppm. |
| Solvent 1 | Introduced with the other starting materials | Mixture of benzene, toluene, ethyl benzene, xylene, (BTEX) and heptane |
| PET | Hangzhou Dahua Plastics Industry Co., Ltd. | Polyethylene terephthalate film, 50 μm thick |
| SUS | Cheminstruments | Stainless steel |
| Release liner 1, RDA | Dongguan Runde Poly Film Plastic Manufacture Co., Ltd | Fluorosilicone release liner, 50 μm thick |
| Release liner 2, RF50FLL169 | Kunshan Sypac Precise Compound Material Co., LTD | Fluorosilicone release liner, 50 μm thick |

TABLE 1-continued

Starting Materials

| Starting Material | Source | Chemical Description |
|---|---|---|
| Release liner 3, F-1042 | Dongguan Runde Poly Film Plastic Manufacture Co., Ltd | Fluorosilicone release liner, 50 μm thick |
| Release liner 4, F5021 | Dongguan Yuancai Electronics Materials Co., Ltd. | Fluorosilicone release liner, 50 μm thick |

In Table 1, the starting materials branded DOWSIL™ and SYL-OFF™ were commercially available from Dow Silicones Corporation.

In this Reference Example 1, samples of hydrosilylation reaction curable compositions were prepared as follows, using the starting materials and amounts shown below in Table 2. Amounts are in weight parts unless otherwise indicated. Starting material (A) the polydiorganosiloxane gum component and starting material (B) the polyorganosilicate resin component was dissolved in (G) the solvent under mixing until the resulting mixture was homogenous. Then starting material (F) the hydrosilylation reaction inhibitor was thoroughly blended into the mixture above. And then starting material (E) the trialkyl borate was thoroughly blended into the mixture above. And then starting material (D) the polyorganohydrogensiloxane was thoroughly blended into the mixture above. And optionally then starting material (H) the anchorage additive (if used) was thoroughly blended into the mixture above. Finally, starting material (C) the hydrosilylation reaction catalyst was added and mixed until homogeneous. All the starting materials were mixed at RT. The starting materials and their amounts (by weight) are shown below in Table 2.

TABLE 2

Hydrosilylation Curable Compositions

| Sample/ Starting Material | Comp 1 | Work 1 | Work 2 | Work 3 | Work 4 | Work 5 |
|---|---|---|---|---|---|---|
| Vi GUM 1 | 0 | 0 | 0 | 0 | 0 | 0 |
| Vi GUM 2 | 35.84 | 35.57 | 35.83 | 35.83 | 35.83 | 35.83 |
| OH GUM 3 | 0 | 0.13 | 0 | 0 | 0 | 0 |
| Me GUM 4 | 0 | 0 | 0 | 0 | 0 | 0 |
| Uncap MQ Resin 1 | 0 | 0.15 | 0 | 0 | 0 | 0 |
| Uncap MQ Resin 2 | 0 | 0 | 0 | 0 | 0 | 0 |
| Me cap MQ Resin 3 | 0 | 0 | 0 | 0 | 0 | 0 |
| Me cap MQ Resin 4 | 62.71 | 62.23 | 62.68 | 62.68 | 62.68 | 62.68 |
| Inhibitor 1 | 0.11 | 0.11 | 0.11 | 0.11 | 0.11 | 0.11 |
| Inhibitor 2 | 0 | 0 | 0 | 0 | 0 | 0 |
| XL 1 | 0.73 | 0.72 | 0.73 | 0.73 | 0.73 | 0.73 |
| XL 2 | 0 | 0 | 0 | 0 | 0 | 0 |
| PSA Additive | 0 | 0.49 | 0.30 | 0.20 | 0.10 | 0.05 |
| Catalyst 1 | 0.60 | 0.60 | 0.60 | 0.60 | 0.60 | 0.60 |

| Sample/ Starting Material | Comp 2 | Work 6 | Comp 3 | Comp 4 |
|---|---|---|---|---|
| Vi GUM 1 | 0 | 0 | 34.73 | 34.47 |
| Vi GUM 2 | 28.25 | 28.03 | 0 | 0 |
| OH GUM 3 | 0 | 0.13 | 0 | 0.12 |
| Me GUM 4 | 7.05 | 7.00 | 0 | 0 |
| Uncap MQ Resin 1 | 0 | 0.15 | 0 | 0.15 |
| Uncap MQ Resin 2 | 0 | 0 | 6.68 | 6.63 |
| Me cap MQ Resin 3 | 0 | 0 | 0 | 0 |
| Me cap MQ Resin 4 | 63.60 | 63.11 | 55.37 | 54.95 |
| Inhibitor 1 | 0.08 | 0.08 | 0.27 | 0.27 |
| Inhibitor 2 | 0 | 0 | 0 | 0 |
| XL 1 | 0.61 | 0.61 | 1.11 | 1.10 |
| XL 2 | 0 | 0 | 0 | 0 |
| PSA Additive | 0 | 0.49 | 0 | 0.48 |
| Catalyst 1 | 0.41 | 0.41 | 1.83 | 1.82 |

| Sample/ Starting Material | Comp 5 | Work 7 | Work 8 | Comp 6 | Comp 7 | Comp 8 |
|---|---|---|---|---|---|---|
| Vi GUM 1 | 43.85 | 43.50 | 43.08 | 42.04 | 40.03 | 38.00 |
| Vi GUM 2 | 0 | 0 | 0 | 0 | 0 | 0 |
| OH GUM 3 | 0 | 0.13 | 0.26 | 0.63 | 0 | 0 |
| Me GUM 4 | 0 | 0 | 0 | 0 | 0 | 0 |
| Uncap MQ Resin 1 | 0 | 0.15 | 0.30 | 0.74 | 0 | 0 |
| Uncap MQ Resin 2 | 0 | 0 | 0 | 0 | 0 | 0 |
| Me cap MQ Resin 3 | 50.57 | 50.16 | 49.68 | 48.48 | 53.53 | 50.82 |
| Me cap MQ Resin 4 | 2.76 | 3.74 | 2.71 | 2.64 | 2.92 | 2.77 |
| Inhibitor 1 | 0.01 | 0.0 | 0.01 | 0.01 | 0 | 0 |
| Inhibitor 2 | 0.35 | 0.35 | 0.34 | 0.34 | 0.37 | 0.35 |
| XL 1 | 0 | 0 | 0 | 0 | 0 | 0 |
| XL 2 | 0.55 | 0.55 | 0.71 | 0.77 | 0.85 | 0.89 |
| PSA Additive | 0 | 0.51 | 1.00 | 2.43 | 0 | 4.97 |
| Catalyst 1 | 1.91 | 1.91 | 1.91 | 1.92 | 2.31 | 2.19 |

The hydrosilylation reaction curable compositions in Table 2 contained small amounts of residual Solvent 1, which was introduced with the starting materials.

In this Reference Example 2, the hydrosilylation reaction curable compositions were coated on substrates and cured according to the following procedure. Each sample prepared as described above was applied on 50 μm thick PET film with a thickness sufficient to provide a dry coat weight of 50 μm thickness after heating in an oven at 150° C. for 3 min for adhesion and probe tack tests, and each sample prepared as described above was applied on a release liner with a thickness sufficient to provide a dry coat weight of 50 μm thickness after healing in an oven at 150° C. for 3 min for wet release force tests. Before testing the release force, 50 μm thick PET film was covered on the (cured) silicone pressure sensitive adhesive layer to protect the silicone pressure sensitive adhesive layer before testing.

The resulting tape samples were applied to adherends such that the silicone pressure sensitive adhesive contacted the adherends. The adherend was SUS, and samples were kept at RI for 20 min after contacting the silicone pressure sensitive adhesive with the adherends before testing.

TABLE 3

Calculated and Measured Values Regarding Hydrosilylation Curable Compositions in Table 2

| Sample/Value | Comp 1 | Work 1 | Work 2 | Work 3 | Work 4 | Work 5 |
|---|---|---|---|---|---|---|
| Triethyl Borate to solid PSA (%) | 0.00% | 0.49% | 0.30% | 0.20% | 0.10% | 0.05% |
| uncapped MQ (%) | 0.00% | 0.19% | 0.00% | 0.00% | 0.00% | 0.00% |
| Me-capped MQ (%) | 62.71% | 62.23% | 62.68% | 62.68% | 62.68% | 62.68% |
| Uncapped MQ/Me-capped MQ (weight ratio) | 0.000 | 0.002 | 0.000 | 0.000 | 0.000 | 0.000 |
| Total MQ (%) | 62.71% | 62.38% | 62.68% | 62.68% | 62.68% | 62.68% |
| Vi-GUM (%) | 35.84% | 35.57% | 35.83% | 35.83% | 35.83% | 35.83% |
| OH-GUM (%) | 0.00% | 0.13% | 0.00% | 0.00% | 0.00% | 0.00% |
| Nonfunctional GUM (wt %) | 0.00% | 0.00% | 0.00% | 0.00% | 0.00% | 0.00% |
| Total GUM (%) | 35.84% | 35.69% | 35.83% | 35.83% | 35.83% | 35.83% |
| Vi-GUM/OH-GUM | N/A | 280.67 | N/A | N/A | N/A | N/A |
| Resin:Gum (B):(A) weight Ratio | 1.75 | 1.75 | 1.75 | 1.75 | 1.75 | 1.75 |
| SiH/Vi Mole Ratio | 31.37 | 31.37 | 31.37 | 31.37 | 31.37 | 31.37 |

| Sample/Value | Comp 2 | Work 6 | Comp 3 | Comp 4 |
|---|---|---|---|---|
| Triethyl Borate to solid PSA (%) | 0.00% | 0.49% | 0.00% | 0.48% |
| uncapped MQ (%) | 0.00% | 0.19% | 10.44% | 10.59% |
| Me-capped MQ (%) | 63.60% | 63.11% | 55.37% | 54.95% |
| Uncapped MQ/Me-capped MQ (weight ratio) | 0.000 | 0.002 | 0.121 | 0.123 |
| Total MQ (%) | 63.60% | 63.26% | 62.05% | 61.73% |
| Vi-GUM (%) | 28.25% | 28.03% | 34.73% | 34.47% |
| OH-GUM (%) | 0.00% | 0.13% | 0.00% | 0.12% |
| Nonfunctional GUM (wt %) | 705.18% | 699.74% | 0.00% | 0.00% |
| Total GUM (%) | 35.30% | 35.15% | 34.73% | 34.60% |
| Vi-GUM/OH-GUM | N/A | 221.54 | N/A | 277.62 |
| Resin:Gum (B):(A) weight Ratio | 1.80 | 1.80 | 1.79 | 1.78 |
| SiH/Vi Mole Ratio | 33.39 | 33.39 | 54.68 | 54.68 |

| Sample/Value | Comp 5 | Work 7 | Work 8 | Comp 6 | Comp 7 | Comp 8 |
|---|---|---|---|---|---|---|
| Triethyl Borate to solid PSA (%) | 0.00% | 0.51% | 1.00% | 2.43% | 0.00% | 4.97% |
| uncapped MQ (%) | 0.00% | 0.19% | 0.37% | 0.90% | 0.00% | 0.00% |
| Me-capped MQ (%) | 53.33% | 52.90% | 52.39% | 51.12% | 56.45% | 53.59% |
| Uncapped MQ/Me-capped MQ (weight ratio) | 0.000 | 0.003 | 0.006 | 0.015 | 0.000 | 0.000 |
| Total MQ (%) | 53.33% | 53.05% | 52.69% | 51.87% | 56.45% | 53.59% |
| Vi-GUM (%) | 43.85% | 43.50% | 43.08% | 42.04% | 40.03% | 38.00% |
| OH-GUM (%) | 0.00% | 0.13% | 0.26% | 0.63% | 0.00% | 0.00% |
| Nonfunctional GUM (wt %) | 0.00% | 0.00% | 0.00% | 0.00% | 0.00% | 0.00% |
| Total GUM (%) | 43.85% | 43.63% | 43.34% | 42.66% | 40.03% | 38.00% |
| Vi-GUM/OH-GUM | Not applicable | 333.74 | 168.25 | 67.19 | Not applicable | Not applicable |
| Resin:Gum (B):(A) weight Ratio | 1.22 | 1.22 | 1.22 | 1.22 | 1.41 | 1.41 |
| SiH/Vi Mole Ratio | 45.28 | 45.28 | 59.04 | 65.92 | 76.44 | 84.41 |

In this Reference Example 3, the samples prepared as described in Reference Example 2 were tested, as follows. Each tape sample prepared as described above was tested for adhesion to the SUS by peeling each tape from the substrate and checking if there was any silicone pressure sensitive adhesive transferred onto the substrate from the PET film. An Adhesion/Release Tester AR-1500 was used. The width of each PET sheet was 1 inch. Peel speed and angle were 0.3 m/min and 180°, respectively. The unit was grams/in. Results are shown below in Table 4.

Adhesion to SUS test methods refers to the test standard ASTM D3330. Clean stainless-steel plate with solvent. Apply tape sample (1 inch in width) to stainless-steel plate. Roll twice in each direction with a standard 2 kg test roller at a speed of 10 mm/s. Peel the sample from steel plate with AR-1500 with a peeling angle of 180° at rate of 300 mm/min after 20 min dwell time.

Rheological data (Tg, G' at 25° C.) test method refers to test standard ASTM D4440-15 Cured pure silicone pressure sensitive adhesive films (without substrate) each having a thickness of 0.5 mm-1.5 mm were prepared for rheological properties testing on parallel plate with 8 mm in diameter on a rheometer, either TA DHR-2 or ARES-G2. Loss modulus G" and storage modulus G' at different temperatures (i.e., from 200° C. to −80° C.) were measured by a temperature ramp program with oscillation mode at a cooling rate of 3° C./min under 1 Hz and a strain of 0.25%. Tan delta was calculated by G"/G'. The glass transition temperature was defined as the temperature at peak point of tan delta. The results are shown below in Table 4.

TABLE 4

Results

| Sample/Value | Comp 1 | Work 1 | Work 2 | Work 3 | Work 4 | Work 5 |
|---|---|---|---|---|---|---|
| Adhesion to SUS (g/inch) | 1438 | 1571 | 1720.00 | 1700.30 | 1544.00 | 1669.30 |
| Adhesion change ratio (<±20%) | | 9.2% | 16.4% | 18.2% | 7.4% | 16.1% |
| Probe Tack (g) | 755 | 765 | 784.41 | 817.94 | 817.54 | 843.82 |
| Tack change ratio (<±20%) | | 1.3% | −0.1% | 8.3% | 8.3% | 11.8% |
| Tg (° C.) | −6.4 | −3.1 | −4.3 | −5.3 | −5.7 | −6.5 |
| change of Tg (<=±6.5° C.) | | 3.3 | 2.1 | 1.0 | 0.7 | −0.1 |
| G' at 25° C. (kPa) | 33.9 | 33.8 | 21.03 | 35.66 | 32.44 | 28.92 |
| G' change ratio (<±50%) | | −0.3% | −37.96% | 5.19% | −4.31% | −14.69% |

| Sample/Value | Comp 2 | Work 6 | Comp | Comp 4 |
|---|---|---|---|---|
| Adhesion to SUS (g/inch) | 1455 | 1401 | 1041 | 1022 |
| Adhesion change ratio (<±20%) | | −3.7% | | −1.8% |
| Probe Tack (g) | 678 | 694 | 676 | 722 |
| Tack change ratio (<±20%) | | 2.3% | | 6.8% |
| Tg (° C.) | −10.6 | −8.5 | −10.7 | −8.14 |
| change of Tg (<=±6.5° C.) | | 2.1 | | 2.56 |
| G' at 25° C. (kPa) | 20.5 | 23.4 | 33.5 | 32.8 |
| G' change ratio (<±50%) | 1455 | 14.2% | | −2.09% |

| Sample/Value | Comp 5 | Work 7 | Work 8 | Comp 6 | Comp 7 | Comp 8 |
|---|---|---|---|---|---|---|
| Adhesion to SUS (g/inch) | 1144 | 1162 | 1121 | 946 | 1544 | 1695 |
| Adhesion change ratio (<±20%) | | 1.6% | −2.0% | −17% | | 10% |
| Probe Tack (g) | 453 | 392 | 370 | 252 | 322 | 286 |
| Tack change ratio (<±20%) | | −13.6% | −18.3% | −44% | | −11% |
| Tg (° C.) | −6.0 | −3.3 | 0.5 | 8.3 | 16.2 | 29.4 |
| change of Tg (<=±6.5° C.) | | 2.7 | 6.5 | 14.3 | | 13.2 |
| G' at 25° C. (kPa) | 78.7 | 86.4 | 113.9 | 176.9 | 193.5 | 228.1 |
| G' change ratio (<+50%) | 1144 | 9.8% | 44.7% | 125% | | 18% |

Change ratios of Working Examples 1-5 were calculated with respect to Comp 1. For example, the adhesion change ratio of work 1 was calculated by ('adhesion to SUS' of work 1−'adhesion to SUS' of comp 1)/('adhesion to SUS' of comp 1)*100%. Change ratio of Working Example 6 was calculated with respect to Comp 2. Change ratio of Comp 4 was calculated with respect to Comp 3.

Change ratios of Working Examples 7 and 8 and Comp 6 were each calculated relative to Comp 5. Change ratios of Comp 8 were calculated relative to Comp 7.

The change ratios of adhesion/probe tack/G' at 25° C. were calculated by comparing each of the working example to the relative comp example. The change of Tg was calculated by comparing the difference of each working example to relative comp example. If the difference of Tg is less than ±6.5° C., it was a working example demonstrating a good result. If the adhesion change ratio was less than ±20%, it was a working example demonstrating a good result. If the probe tack change ratio was less than ±20%, it was working example demonstrating a good result. If the G' at 25° C. change ratio was less than ±50%, it was working example demonstrating a good result. If the release force change ratio was less than 0, which means the release force has a decrease, this was a working example demonstrating a good result. In the Tables 5a, 6a, 7a, and 8a below, release force change ratio was calculated by comparing each of the Working Examples to Comp 1. In Tables 5b, 6b, and 7b release force change ratio of Working Example 6 was calculated by comparing Working Example 6 to Comp 2. In Tables 5b, 6b, and 7b, release force change ratio of Comp. 4 was calculated by comparison with Comp. 3. In Tables 5c, 6c, and 7c, release force change ratio of Working Examples 7 and 8 was calculated by comparison with Comp 5. In Tables 5c, 6c, and 7c, release force change ratio of Comp 8 was calculated by comparison to Comp 7. 'Comp.' refers to a comparative example.

In this Reference Example 4, the samples of hydrosilylation reaction curable compositions prepared as described in Reference Example 1 were directly coating on coated release liner and cured. Thereafter, a 50 um PET was laminated onto the surface of the cured silicone pressure sensitive adhesive opposite the release liner to protect the surface before use, and then cut with 1 inch width. Load weight of 20 g/cm2 on laminated sample and left under RT for 20 hours or in an oven under 70° C. for 3 days. After RT-20 hours or 70° C.-3 days, remove the load and placed samples in RT for at least 30 mins. The release liner was on the top for this test. Then test the release force with liner side by ChemInstruments AR-1500. Refer to FINAT Test Method No. 10 (FINAT Technical Handbook 7th edition, 2005). The results are shown below in Tables 5-9.

TABLE 5a

Wet Casting Results on Release Liner 3 - F-1042

| Pulling Speed | Sample | Comp 1 (col. F) | Work 1 (col. G) | Work 2 (col. H) | Work 3 (col. I) | Work 4 (col. J) | Work 5 (col. K) |
|---|---|---|---|---|---|---|---|
| 0.3 mpm | Initial RF | 358.6 | 45.3 | 148.6 | 194.9 | 242.0 | 288.8 |
|  | Initial RF-change ratio |  | −87.4% | −58.6% | −45.6% | −32.5% | −19.5% |
|  | 3 d aged RF | 395.4 | 268.5 | 150.1 | 184.9 | 226.9 | 242.7 |
|  | 3 d aged RF change ratio |  | −32.1% | −62.0% | −53.2% | −42.6% | −38.6% |
| 2.4 mpm | Initial RF | 346.5 | 174 | 71.8 | 183.5 | 231.9 | 201.5 |
|  | Initial RF-change ratio |  | −49.8% | −79.3% | −47.1% | −33.1% | −41.8% |
|  | 3 d aged RF | 367.95 | 276.5 | 189.9 | 147.3 | 229.0 | 204.0 |
|  | 3 d aged RF-change ratio |  | −24.9% | −48.4% | −60.0% | −37.8% | −44.6% |

TABLE 5b

Wet Casting Results on Release Liner 3 - F-1042

| Pulling Speed | Sample | Comp 2 | Work 6 | Comp 3 | Comp 4 |
|---|---|---|---|---|---|
| 0.3 mpm | Initial RF | Not tested | Not tested | 124.7 | 145.2 |
|  | Initial RF-change ratio | Not tested | Not tested |  | 16% |
|  | 3 d aged RF | Not tested | Not tested | 108.8 | 137.4 |
|  | 3 d aged RF - change ratio | Not tested | Not tested |  | 26% |
| 2.4 mpm | Initial RF | Not tested | Not tested | 319.4 | 325.8 |
|  | Initial RF-change ratio | Not tested | Not tested |  | 2% |
|  | 3 d aged RF | Not tested | Not tested | 292.9 | 382.1 |
|  | 3 d aged RF - change ratio | Not tested | Not tested |  | 30% |

TABLE 5c

Wet Casting Results on Release Liner 3 - F-1042

| Pulling Speed | Sample | Comp 5 | Work 7 | Work 8 | Comp 6 | Comp 7 | Comp 8 |
|---|---|---|---|---|---|---|---|
| 0.3 mpm | Initial RF | 148.95 | 146.95 | 130.45 | 202 | 109.9 | 157.8 |
|  | Initial RF-change ratio |  | −1.3% | −12% | 35.6% |  | 43.6% |
|  | 3 d aged RF | 150.45 | 129.8 | 122.9 | 212.55 | 108.85 | 36.7 |
|  | 3 d aged RF-change ratio |  | −13.7% | −18% | 41.3% |  | −66.3% |
| 2.4 mpm | Initial RF | 294.75 | 228.6 | 187.45 | 302.25 | 68.4 | 153.1 |
|  | Initial RF-change ratio |  | −22.4% | −36% | 2.5% |  | 124.0% |
|  | 3 d aged RF | 299.05 | 257.45 | 255.25 | 288.35 | 55.3 | 29.2 |
|  | 3 d aged RF-change ratio |  | −13.9% | −15% | −3.6% |  | −47.1% |

TABLE 6a

Wet Casting Results on Release Liner 1 - RDA

| Pulling Speed | Sample | Comp 1 | Work 1 | Work 2 | Work 3 | Work 4 | Work 5 |
|---|---|---|---|---|---|---|---|
| 0.3 mpm | Initial RF | 28.2 | 16.5 | Not tested | Not tested | Not tested | Not tested |
|  | Initial RF-change ratio |  | −41.5% | Not tested | Not tested | Not tested | Not tested |
|  | 3 d aged RF | 29.5 | 16.8 | Not tested | Not tested | Not tested | Not tested |
|  | 3 d aged RF-change ratio |  | −43.1% | Not tested | Not tested | Not tested | Not tested |
| 2.4 mpm | Initial RF | 51.5 | 22.5 | Not tested | Not tested | Not tested | Not tested |
|  | Initial RF-change ratio |  | −56.3% | Not tested | Not tested | Not tested | Not tested |
|  | 3 d aged RF | 62.3 | 24.5 | Not tested | Not tested | Not tested | Not tested |
|  | 3 d aged RF-change ratio |  | −60.7% | Not tested | Not tested | Not tested | Not tested |

TABLE 6b

Wet Casting Results on Release Liner 1 - RDA

| Pulling Speed | Sample | Comp 2 | Work 6 | Comp 3 | Comp 4 |
|---|---|---|---|---|---|
| 0.3 mpm | Initial RF | 23.7 | 15.35 | Not tested | Not tested |
|  | Initial RF-change ratio |  | −35.2% | Not tested | Not tested |
|  | 3 d aged RF | 24.2 | 16.35 | Not tested | Not tested |
|  | 3 d aged RF - change ratio |  | −32.4% | Not tested | Not tested |
| 2.4 mpm | Initial RF | 52.1 | 22.1 | Not tested | Not tested |
|  | Initial RF-change ratio |  | −57.6% | Not tested | Not tested |
|  | 3 d aged RF | 50.23 | 18.52 | Not tested | Not tested |
|  | 3 d aged RF - change ratio |  | −63.1% | Not tested | Not tested |

TABLE 6c

Wet Casting Results on Release Liner 1 - RDA

| Pulling Speed | Sample | Comp 5 (col. L) | Working 7 (col. M) | Working 8 (col. N) | Comp 6 (col. O) | Comp 7 (col. P) | Comp 8 (col. Q) |
|---|---|---|---|---|---|---|---|
| 0.3 mpm | Initial RF | Not tested | Not tested | Not tested | Not tested | Not tested | Not tested |
|  | Initial RF-decrease ratio | Not tested | Not tested | Not tested | Not tested | Not tested | Not tested |
|  | 3 d aged RF | Not tested | Not tested | Not tested | Not tested | Not tested | Not tested |
|  | 3 d aged RF-decrease ratio | Not tested | Not tested | Not tested | Not tested | Not tested | Not tested |
| 2.4 mpm | Initial RF | Not tested | Not tested | Not tested | Not tested | Not tested | Not tested |
|  | Initial RF-decrease ratio | Not tested | Not tested | Not tested | Not tested | Not tested | Not tested |
|  | 3 d aged RF | Not tested | Not tested | Not tested | Not tested | Not tested | Not tested |
|  | 3 d aged RF-decrease ratio | Not tested | Not tested | Not tested | Not tested | Not tested | Not tested |

TABLE 7a

Wet Casting Results on Release Liner 2 - RF50FLL169

| Pulling Speed | Sample | Comp 1 | Work 1 | Work 2 | Work 3 | Work 4 | Work 5 |
|---|---|---|---|---|---|---|---|
| 0.3 mpm | Initial RF | 37.8 | 17.4 | Not tested | Not tested | Not tested | Not tested |
| | Initial RF-change ratio | | −54.0% | Not tested | Not tested | Not tested | Not tested |
| | 3 d aged RF | 62.0 | 21.8 | Not tested | Not tested | Not tested | Not tested |
| | 3 d aged RF-change ratio | | −64.8% | Not tested | Not tested | Not tested | Not tested |
| 2.4 mpm | Initial RF | 51.9 | 25.1 | Not tested | Not tested | Not tested | Not tested |
| | Initial RF-change ratio | | −51.7% | Not tested | Not tested | Not tested | Not tested |
| | 3 d aged RF | 45.9 | 25.8 | Not tested | Not tested | Not tested | Not tested |
| | 3 d aged RF-change ratio | | −43.8% | Not tested | Not tested | Not tested | Not tested |

TABLE 7b

Wet Casting Results on Release Liner 2 - RF50FLL169

| Pulling Speed | Sample | Comp 2 | Work 6 | Comp 3 | Comp 4 |
|---|---|---|---|---|---|
| 0.3 mpm | Initial RF | 23.35 | 17.2 | 11.1 | 20.0 |
| | Initial RF-change ratio | | −26.3% | | 80% |
| | 3 d aged RF | 25.22 | 18.65 | 12.0 | 23.5 |
| | 3 d aged RF-change ratio | | −26.1% | | 96% |
| 2.4 mpm | Initial RF | 72.05 | 27 | 70.8 | 73.7 |
| | Initial RF-change ratio | | −62.5% | | 4% |
| | 3 d aged RF | 65.22 | 25.36 | 60.2 | 107.4 |
| | 3 d aged RF-change ratio | | −61.1% | | 78% |

TABLE 7c

Wet Casting Results on Release Liner 2 - RF50FLL169

| Pulling Speed | Sample | Comp 5 | Work 7 | Work 8 | Comp 6 | Comp 7 | Comp 8 |
|---|---|---|---|---|---|---|---|
| 0.3 mpm | Initial RF | 7.6 | 7.05 | 6.55 | 10.45 | Not tested | Not tested |
| | Initial RF-change ratio | | −7.2% | −14% | 37.5% | Not tested | Not tested |
| | 3 d aged RF | 8.7 | 8.1 | 8.55 | 11.65 | Not tested | Not tested |
| | 3 d aged RF-change ratio | | −6.9% | −2% | 33.9% | Not tested | Not tested |
| 2.4 mpm | Initial RF | 23.2 | 19.5 | 21.65 | 22.2 | Not tested | Not tested |
| | Initial RF-change ratio | | −15.9% | −7% | −4.3% | Not tested | Not tested |
| | 3 d aged RF | 25.65 | 19.6 | 18.9 | 21.3 | Not tested | Not tested |
| | 3 d aged RF-change ratio | | −23.6% | −26% | −17.0% | Not tested | Not tested |

TABLE 8a

Wet Casting Results on Release Liner 4 - F5021

| Pulling Speed | Sample | Comp 1 | Work 1 | Work 2 | Work 3 | Work 4 | Work 5 |
|---|---|---|---|---|---|---|---|
| 0.3 mpm | Initial RF | 307 | 41.3 | Not tested | Not tested | Not tested | Not tested |
| | Initial RF-change ratio | | −86.5% | Not tested | Not tested | Not tested | Not tested |
| | 3 d aged RF | 310.2 | 183.7 | Not tested | Not tested | Not tested | Not tested |
| | 3 d aged RF - change ratio | | −40.8% | Not tested | Not tested | Not tested | Not tested |
| 2.4 mpm | Initial RF | 242.5 | 119.1 | Not tested | Not tested | Not tested | Not tested |
| | Initial RF-change ratio | | −50.9% | Not tested | Not tested | Not tested | Not tested |
| | 3d aged RF | 328.5 | 170.9 | Not tested | Not tested | Not tested | Not tested |
| | 3d aged RF - change ratio | | −48.0% | Not tested | Not tested | Not tested | Not tested |

TABLE 8b

Wet Casting Results on Release Liner 4 - F5021

| Pulling Speed | Sample | Comp 2 | Work 6 | Comp 3 | Comp 4 |
|---|---|---|---|---|---|
| 0.3 mpm | Initial RF | Not tested | Not tested | Not tested | Not tested |
| | Initial RF-change ratio | Not tested | Not tested | Not tested | Not tested |
| | 3 d aged RF | Not tested | Not tested | Not tested | Not tested |
| | 3 d aged RF - change ratio | Not tested | Not tested | Not tested | Not tested |
| 2.4 mpm | Initial RF | Not tested | Not tested | Not tested | Not tested |
| | Initial RF-change ratio | Not tested | Not tested | Not tested | Not tested |
| | 3 d aged RF | Not tested | Not tested | Not tested | Not tested |
| | 3 d aged RF - change ratio | Not tested | Not tested | Not tested | Not tested |

TABLE 8c

Wet Casting Results on Release Liner 4 - F5021

| Pulling Speed | Sample | Comp 5 | Work 7 | Work 8 | Comp 6 | Comp 7 | Comp 8 |
|---|---|---|---|---|---|---|---|
| 0.3 mpm | Initial RF | Not tested | Not tested | Not tested | Not tested | Not tested | Not tested |
| | Initial RF-change ratio | Not tested | Not tested | Not tested | Not tested | Not tested | Not tested |
| | 3 d aged RF | Not tested | Not tested | Not tested | Not tested | Not tested | Not tested |
| | 3 d aged RF-change ratio | Not tested | Not tested | Not tested | Not tested | Not tested | Not tested |
| 2.4 mpm | Initial RF | Not tested | Not tested | Not tested | Not tested | Not tested | Not tested |
| | Initial RF-change ratio | Not tested | Not tested | Not tested | Not tested | Not tested | Not tested |
| | 3 d aged RF | Not tested | Not tested | Not tested | Not tested | Not tested | Not tested |
| | 3 d aged RF-change ratio | Not tested | Not tested | Not tested | Not tested | Not tested | Not tested |

INDUSTRIAL APPLICABILITY

The examples above show that hydrosilylation reaction curable compositions can be prepared that cure to form silicone pressure sensitive adhesives with desirable adhesive properties of adhesion to stainless steel of >1000 g/inch at RT, a lower release force, and a G' at 25° C. of <0.1 MPa, and a Tg<0° C. The silicone pressure sensitive adhesives may also have Tg≤−10° C., alternatively ≤−20° C., and the G' at 25° C. may also be <50 kPa. Without wishing to be bound by theory, it is thought that the low Tg and low G' makes the silicone pressure sensitive adhesive suitable for use at broad temperature ranges with low stress imposed onto other layers during repeated deformation tests (e.g., folding, bending, rolling and stretching tests). The lower release force when wet casting brings benefits to the process to make flexible display devices. This combination of properties makes the silicone pressure sensitive adhesive suitable for use in fabricating multilayer components of flexible display devices, particularly when used to fabricate free standing films or films that can be used to adhere various layers in flexible display devices, such as a damping layer or a polarization layer.

Definitions and Usage of Terms

All amounts, ratios, and percentages herein are by weight, unless otherwise indicated. The SUMMARY and ABSTRACT are hereby incorporated by reference. The singular includes the plural, and the articles, "a", "an", and "the" each refer to one or more, unless otherwise indicated by the context of the specification. The transitional phases "comprising", "consisting essentially of", and "consisting of" are used as described in the Manual of Patent Examining Procedure Ninth Edition, Revision 08.2017, Last Revised January 2018 at section § 2111.03 I., II., and III. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The abbreviations used herein have the definitions in Table 9.

TABLE 9

Abbreviations

| Abbreviation | Definition |
|---|---|
| ° C. | degree Celsius |
| g | gram |
| G' | modulus |
| GPC | Gel permeation chromatography, used to measure molecular weight of resins herein according to the method described in U.S. Pat. No. 9,593,209 |
| gsm | Gram per square meter |
| HCR | high consistency rubber |
| hr | hour |
| k | kilo |
| LSR | liquid silicone rubber |
| m | meter |
| M | mega |
| Me | methyl |
| min | minute |
| mL | milliliter |
| mm | millimeter |
| Mn | Number Average Molecular Weight measured by GPC, in units of grams/mole |
| $M^{OH}$ | a monofunctional siloxane unit of formula ((HO)Me$_2$SiO$_{1/2}$) |
| $M^{Vi}$ | a monofunctional siloxane unit of formula (Me$_2$ViSiO$_{1/2}$) |
| mol | mole |

TABLE 9-continued

Abbreviations

| Abbreviation | Definition |
|---|---|
| mpm | Meter per minute |
| Pa | Pascal |
| ppm | part per million |
| psi | pounds per square inch |
| RT | room temperature of 22° C. ± 2° C. |
| s | second |
| Tg | glass transition temperature |
| uL | microliter |
| μm or um | micrometer |
| Vi | vinyl |

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and any other subrange subsumed within the range. As just one example, a range of "0.05 to 1.00" may be further delineated into a lower third, i.e., 0.05 to 0.36, a middle third, i.e., 0.37 to 0.0.68, and an upper third, i.e., from 0.69 to 1.00, and alternatively, the range "0.05 to 1.00" includes the subrange "0.05 to 0.30", "0.05 to 0.20", "0.30 to 0.50", and "0.51 to 1.00" each which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

What is claimed is:

1. A hydrosilylation reaction curable composition for forming a silicone pressure sensitive adhesive, where the composition comprises:
   35.15 weight % to 43.63 weight %, based on combined weights of starting materials (A) to (F), of (A) a polydiorganosiloxane gum component comprising
   28.03 weight % to 43.50 weight %, based on combined weights of the starting materials (A) to (F), of (A-1) an aliphatically unsaturated polydiorganosiloxane gum of unit formula $(R^M{}_2R^U SiO_{1/2})_2(R^M{}_2SiO_{2/2})_a$, where each $R^M$ is an independently selected monovalent hydrocarbon group of 1 to 30 carbon atoms that is free of aliphatic unsaturation; each $R^U$ is an independently selected monovalent aliphatically unsaturated hydrocarbon group of 2 to 30 carbon atoms; and subscript a has a value sufficient to give the polydiorganosiloxane gum a plasticity of 20 mil (0.51 mm) to 80 mil (2.03 mm), where plasticity is measured based on ASTM D926 by applying 1 kg load to a spherical sample of 4.2 g in weight for 3 minutes at 25° C. and the results are measured in thousandths of an inch (mil) and the procedure is based on ASTM D926;

0 to 0.26 weight % of (A-2) a hydroxyl-terminated polydiorganosiloxane gum of unit formula ((HO)$R^M{}_2SiO_{1/2})_2(R^M{}_2SiO_{2/2})_{a'}$, where each $R^M$ is an independently selected monovalent hydrocarbon group of 1 to 30 carbon atoms that is free of aliphatic unsaturation; each subscript a' has a value sufficient to give the polydiorganosiloxane gum a plasticity of 20 mil (0.51 mm) to 80 mil (2.03 mm); and 0 to 7 weight % of (A-3) a non-functional polydiorganosiloxane gum of unit formula $(R^M{}_3SiO_{1/2})_2(R^M{}_2SiO_{2/2})_{a''}$, where each $R^M$ is an independently selected monovalent hydrocarbon group of 1 to 30 carbon atoms that is free of aliphatic unsaturation, and subscript a" has a value sufficient to give the non-functional polydiorganosiloxane gum a plasticity of 20 mil (0.51 mm) to 80 mil (2.03 mm);

52.69 weight % to 63.26 weight % of (B) a polyorganosilicate resin component comprising 52.39 weight % to 63.11 weight %, based on combined weights of the starting materials (A) to (F), of (B-1) a capped resin of unit formula: $(R^M{}_3SiO_{1/2})_z(SiO_{4/2})_oZ_p$, where each $R^M$ is an independently selected monovalent hydrocarbon group of 1 to 30 carbon atoms that is free of aliphatic unsaturation, Z is a hydrolyzable group, subscript p is 0 to a value sufficient to give the capped resin a hydrolyzable group content up to 2%, subscripts z and o have values such that z>4, o>1, and a quantity (z+o) has a value sufficient to provide the capped resin with a number average molecular weight of 500 g/mol to 5,000 g/mol; and 0 to 0.37 weight %, based on combined weights of the starting materials (A) to (F), of (B-2) an uncapped resin of unit formula $(R^M{}_3SiO_{1/2})_{z'}(SiO_{4/2})_{o'}Z_{p'}$, where each $R^M$ is an independently selected monovalent hydrocarbon group of 1 to 30 carbon atoms that is free of aliphatic unsaturation, Z is a hydrolyzable group, subscript p' has a value sufficient to give the uncapped resin a hydrolyzable group content of >3% to 10%, subscripts z' and o' have values such that z'>4, o'>1, and a quantity (z'+o') has a value sufficient to provide the uncapped resin with a number average molecular weight of 500 g/mol to 5,000 g/mol;

where (A) the polydiorganosiloxane gum component and (B) the polyorganosilicate resin component are present in a weight ratio of (B):(A) (Resin: Gum Ratio)≤1.8:1;

0.01 weight % to 5 weight %, based on combined weights of the starting materials (A) to (F), of (C) a hydrosilylation reaction catalyst;

(D) a polyorganohydrogensiloxane of unit formula: $(R^M{}_2SiO_{2/2})_e(HR^MSiO_{2/2})_f(R^M{}_2HSiO_{1/2})_g(R^M{}_3SiO_{1/2})_h$; where each $R^M$ is an independently selected monovalent hydrocarbon group of 1 to 30 carbon atoms that is free of aliphatic unsaturation, subscript e>0, subscript f≥0, a quantity (e+f) is 4 to 500, subscript g is 0, 1, or 2, subscript h is 0, 1, or 2, a quantity (g+h)=2, and a quantity (f+g)≥3; where (D) the polyorganohydrogensiloxane is present in an amount sufficient to provide a mole ratio of silicon bonded hydrogen atoms to aliphatically unsaturated hydrocarbon groups of (A) the polydiorganosiloxane gum component, {(D):(A) ratio}, of 31.37:1 to 59.04:1;

0.05 weight % to 1.00 weight %, based on combined weights of the starting materials (A) to (F), of (E) a trialkyl borate;

0 weight % to 5 weight %, based on combined weights of the starting materials (A) to (F), of (F) a hydrosilylation reaction inhibitor;

greater than 0 weight % to 90 weight %, based on combined weights of all starting materials in the composition, of (G) a solvent; and 0 to 5 weight %, based on combined weights of the starting materials (A) to (F), of (H) an anchorage additive.

2. The composition of claim 1, where in (B) the polyorganosilicate resin component, each $R^M$ is an independently selected alkyl group of 1 to 6 carbon atoms; each Z is OH; and the quantity (z+o) has a value sufficient to provide (B-1) the capped resin with a number average molecular weight of 2,900 g/mol to 4,100 g/mol.

3. The composition of claim 1, where (C) the hydrosilylation reaction catalyst comprises Karstedt's catalyst.

4. The composition of claim 1, where in (D) the polyorganohydrogensiloxane, each $R^M$ is an independently selected alkyl group of 1 to 6 carbon atoms, subscript g=0, and subscript h=2.

5. The composition of claim 1, where (E) the trialkyl borate comprises triethyl borate.

6. The composition of claim 5, where the composition is a multiple part composition comprising a base part and a curing agent part, where the base part comprises (A) the polydiorganosiloxane gum component and (C) the hydrosilylation reaction catalyst; and the curing agent part comprises (A) the polydiorganosiloxane gum component, and (D) the polyorganohydrogensiloxane; and the composition further comprises (B) the polyorganosilicate resin, (E) the trialkyl borate, and (F) the hydrosilylation reaction inhibitor in one or more of the base part, the curing agent part, or a separate additional part.

7. A wet casting method comprising
1) applying the composition according to claim 5 to a substrate, and
2) curing the composition to form the silicone pressure sensitive adhesive on the substrate.

8. A dry casting method comprising
1) applying the composition according to claim 5 to a release liner,
2) curing the composition to form the silicone pressure sensitive adhesive on the release liner, and
3) applying the silicone pressure sensitive adhesive to a substrate.

9. The method of claim 8, further comprising removing the release liner and contacting the silicone pressure sensitive adhesive with a component of a flexible display device.

10. The method of claim 8, where the substrate is a second release liner.

11. The method of claim 10, further comprising removing the second release liner, and contacting the silicone pressure sensitive adhesive with a second component of the flexible display device.

12. An article prepared by the method of claim 9.

13. The article of claim 12, where the component of the flexible display device substrate comprises a polarization layer or a damping layer.

14. A component of foldable display device comprising:
I) an optical substrate layer, and
II) a silicone pressure sensitive adhesive layer adhered to the optical substrate layer, wherein the silicone pressure sensitive adhesive layer is a product of the composition of claim 5.

15. The method of claim 9, where the substrate is a second release liner.

16. An article prepared by the method of claim 11.

* * * * *